April 18, 1933.  H. A. FOOTHORAP  1,904,127
AUTOMATIC ELECTRIC WRITING-COMPUTING MACHINE
Filed Sept. 13, 1926    17 Sheets-Sheet 1
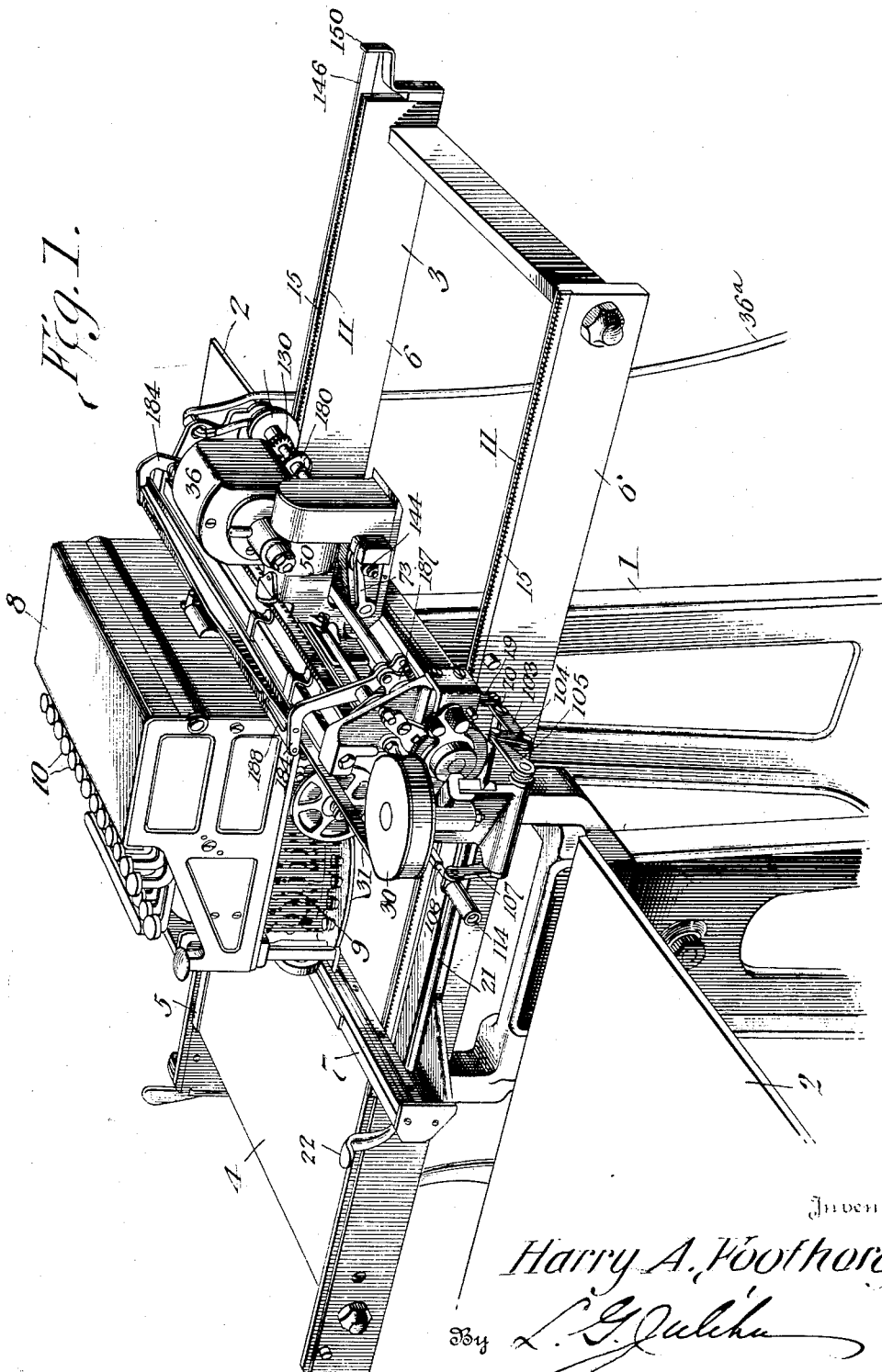

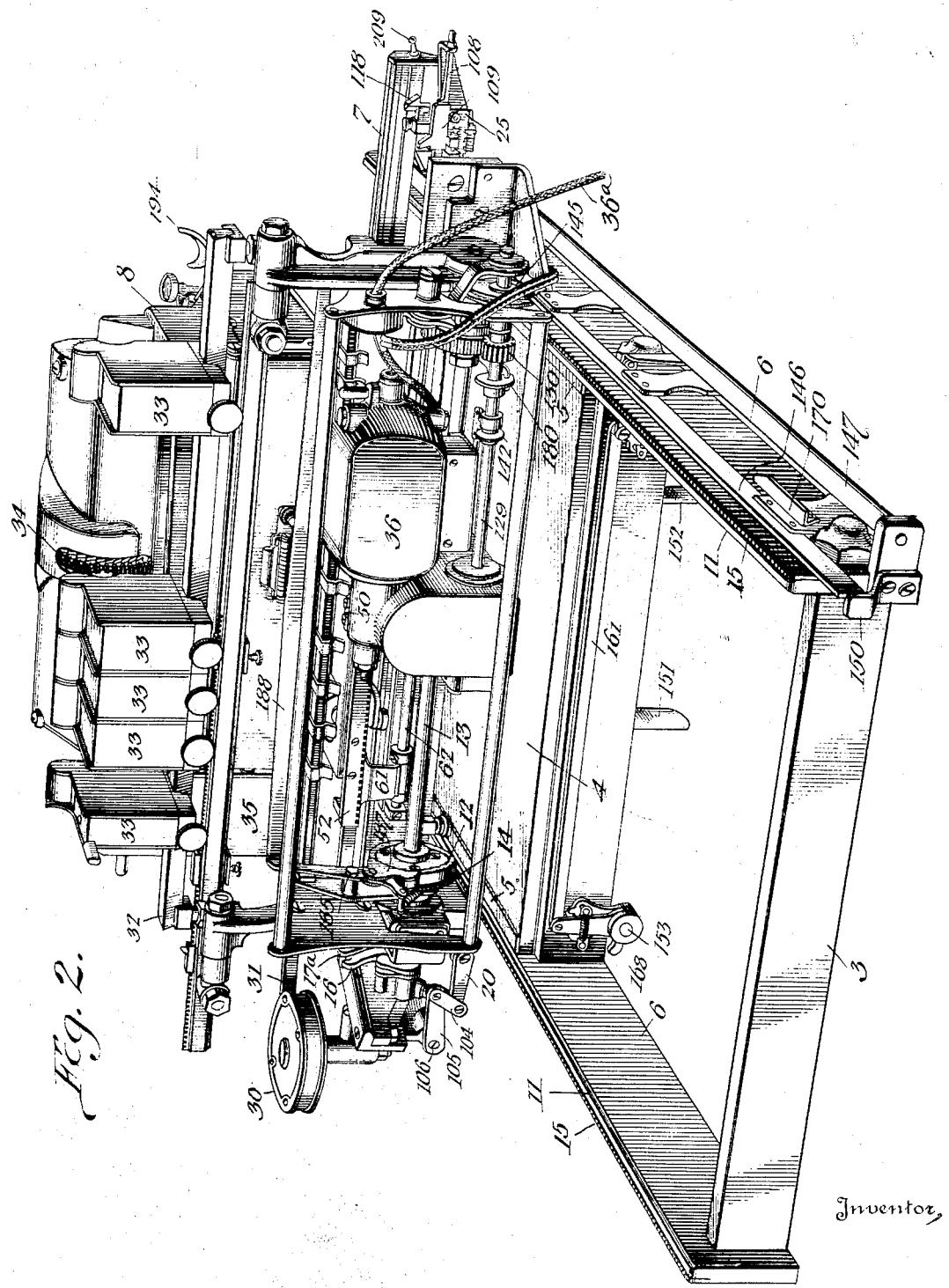

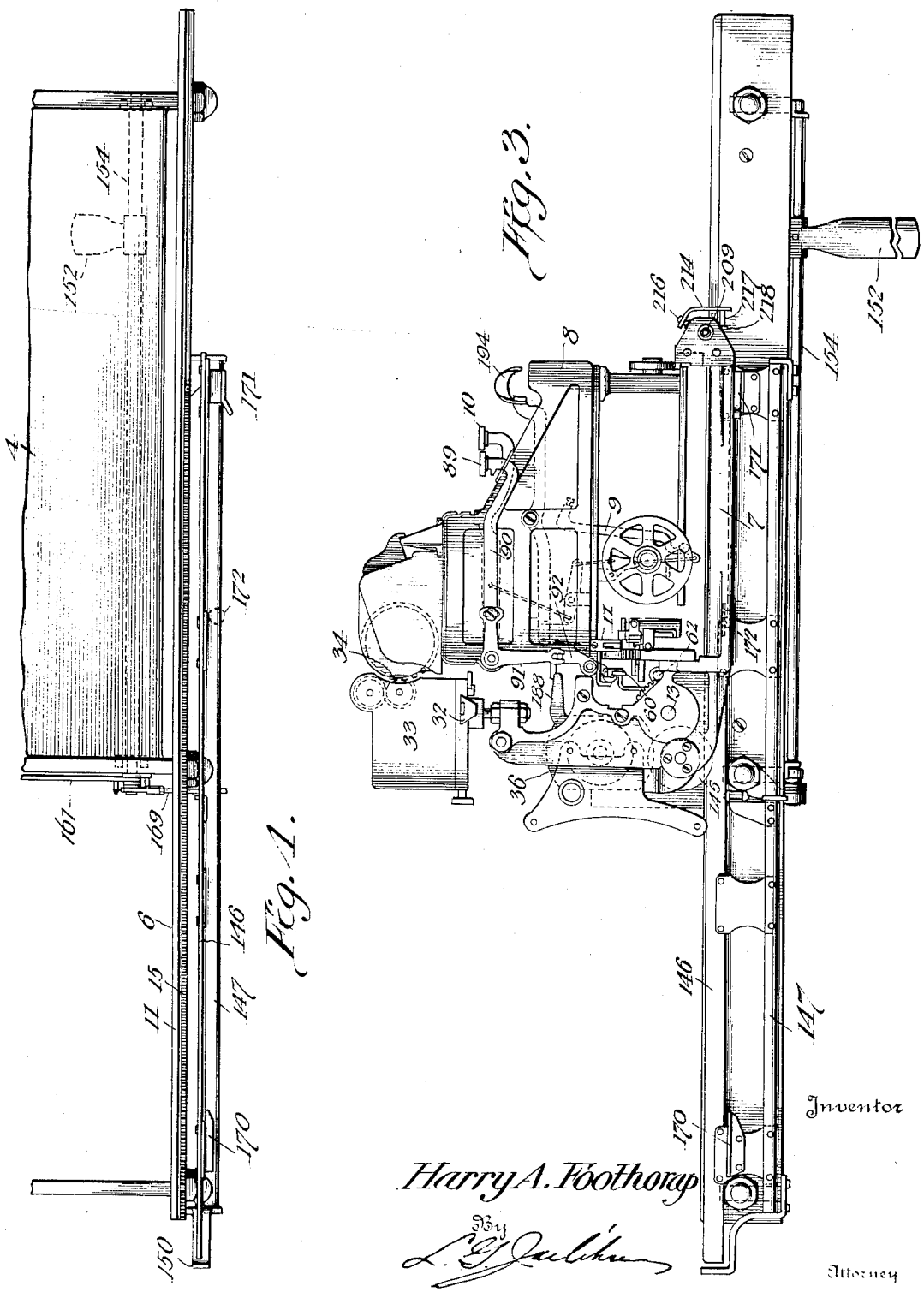

April 18, 1933.  H. A. FOOTHORAP  1,904,127
AUTOMATIC ELECTRIC WRITING-COMPUTING MACHINE
Filed Sept. 13, 1926    17 Sheets-Sheet 4

Inventor
Harry A. Foothorap.
By
Attorney

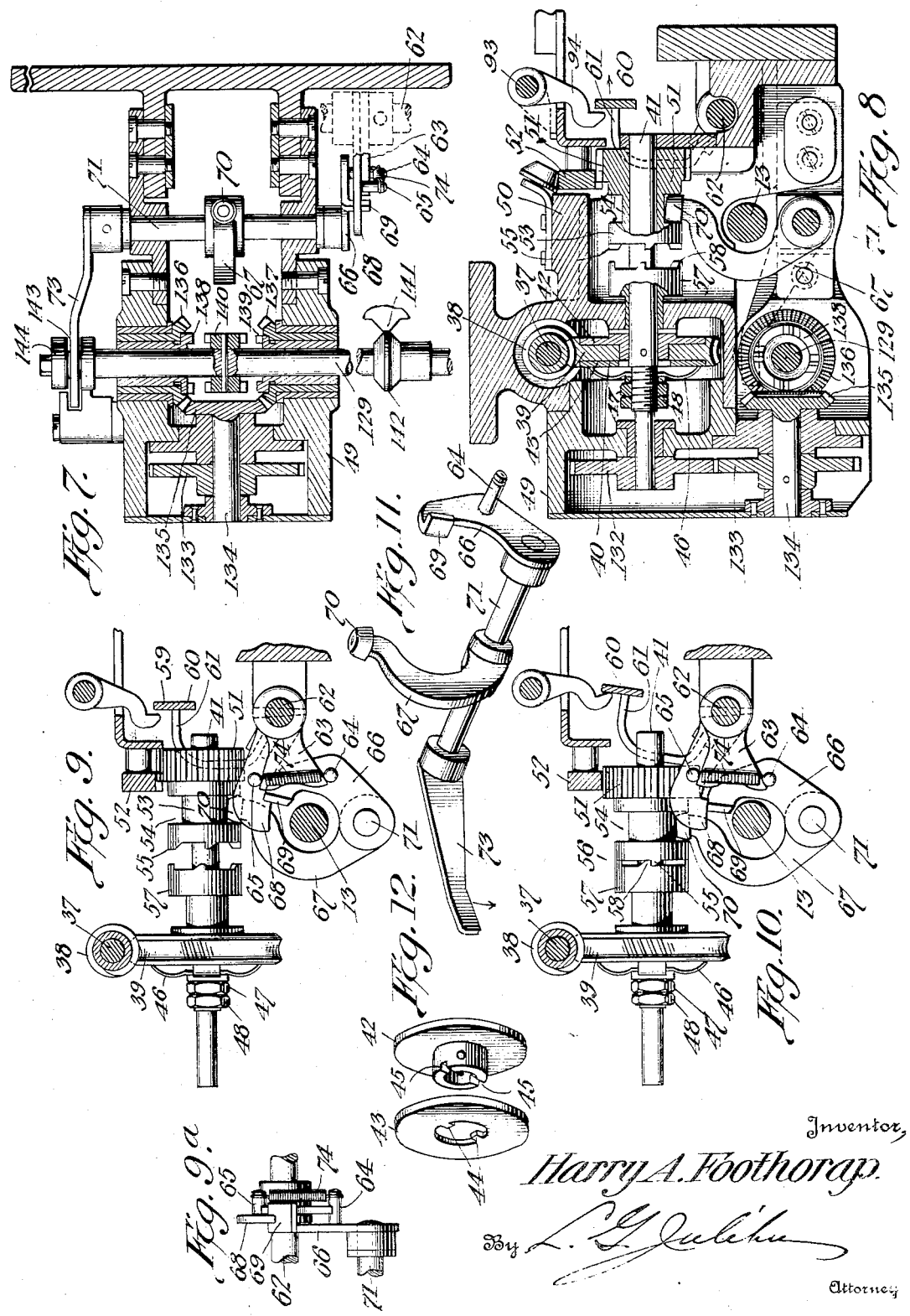

April 18, 1933.  H. A. FOOTHORAP  1,904,127
AUTOMATIC ELECTRIC WRITING-COMPUTING MACHINE
Filed Sept. 13, 1926   17 Sheets-Sheet 6
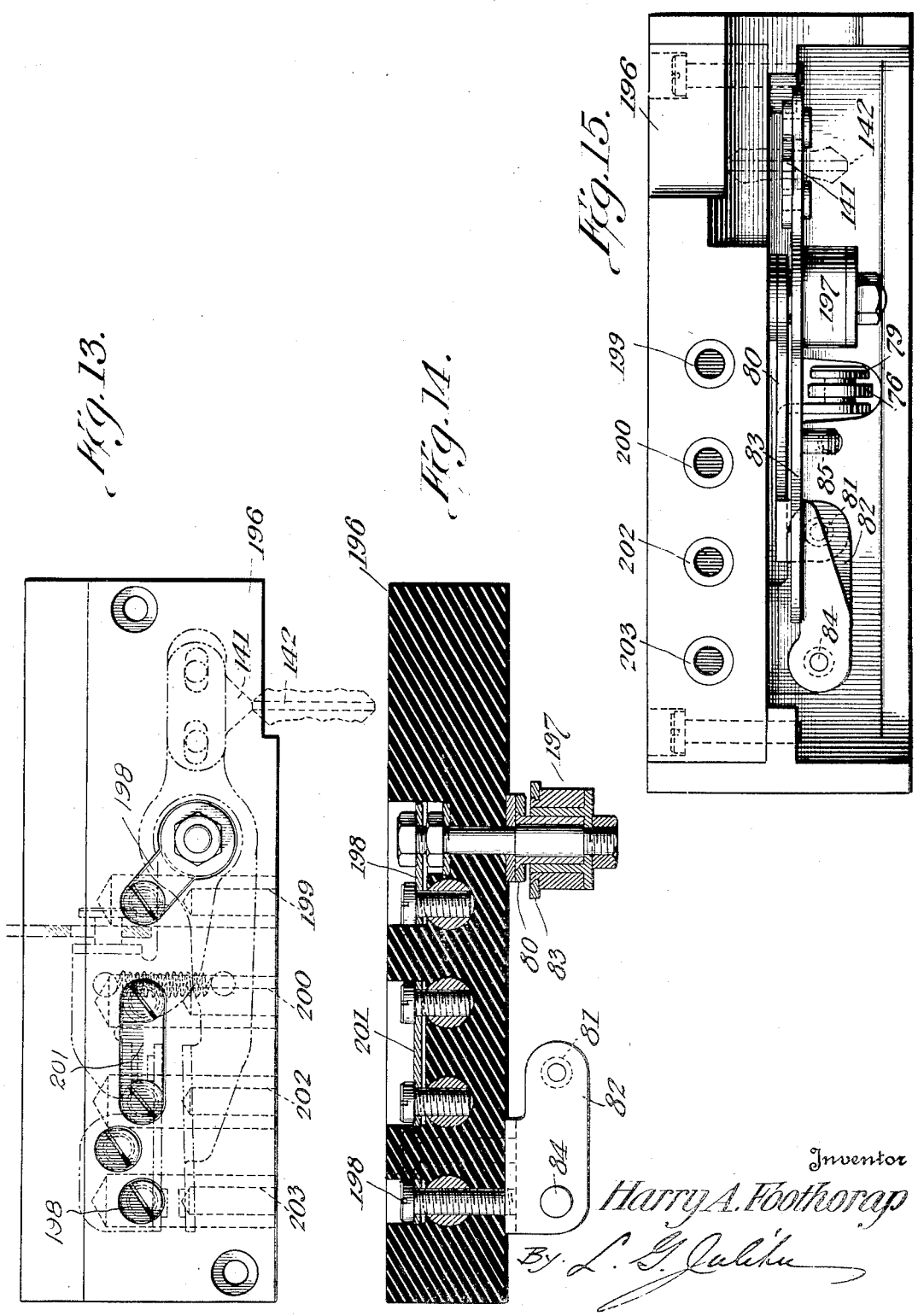

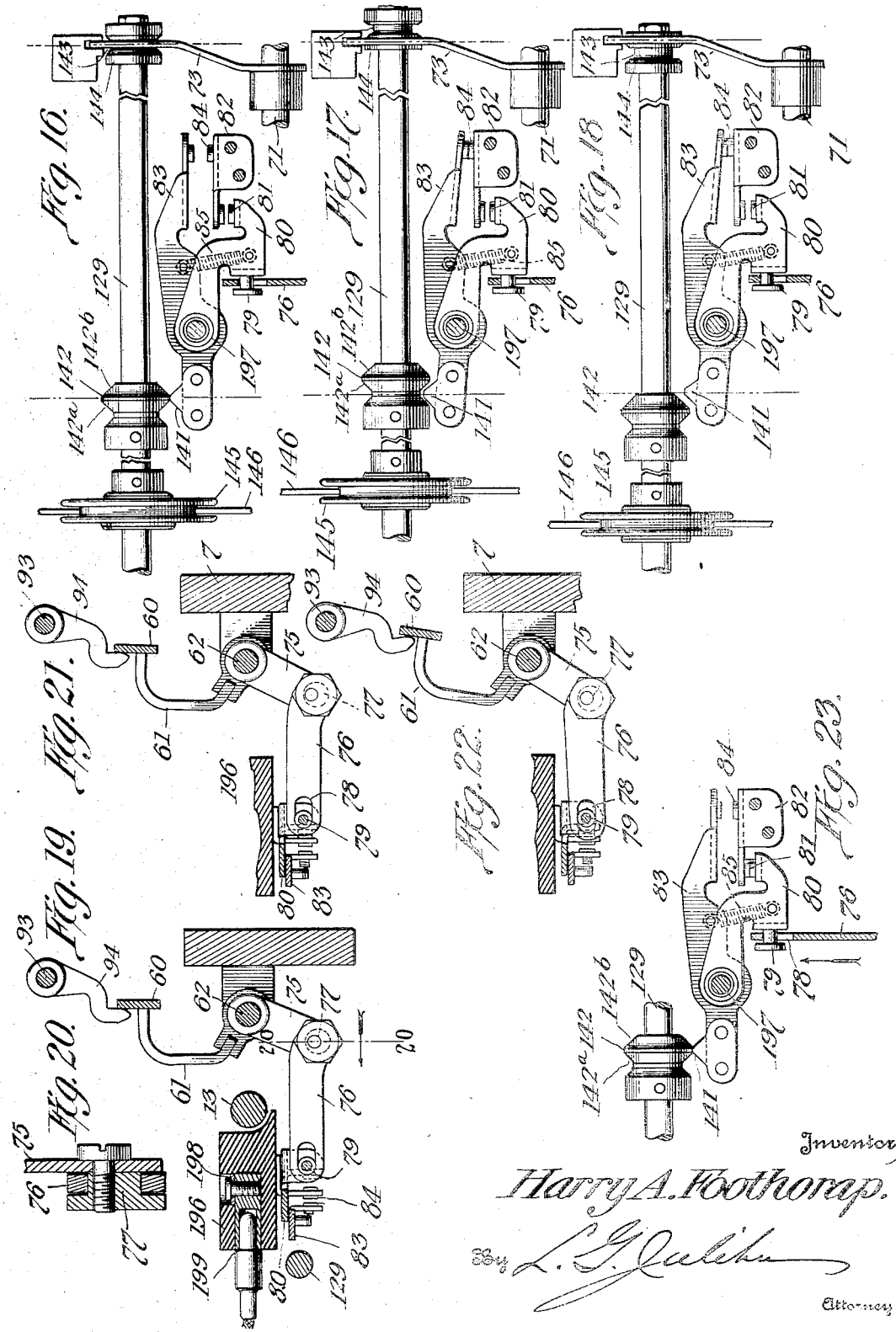

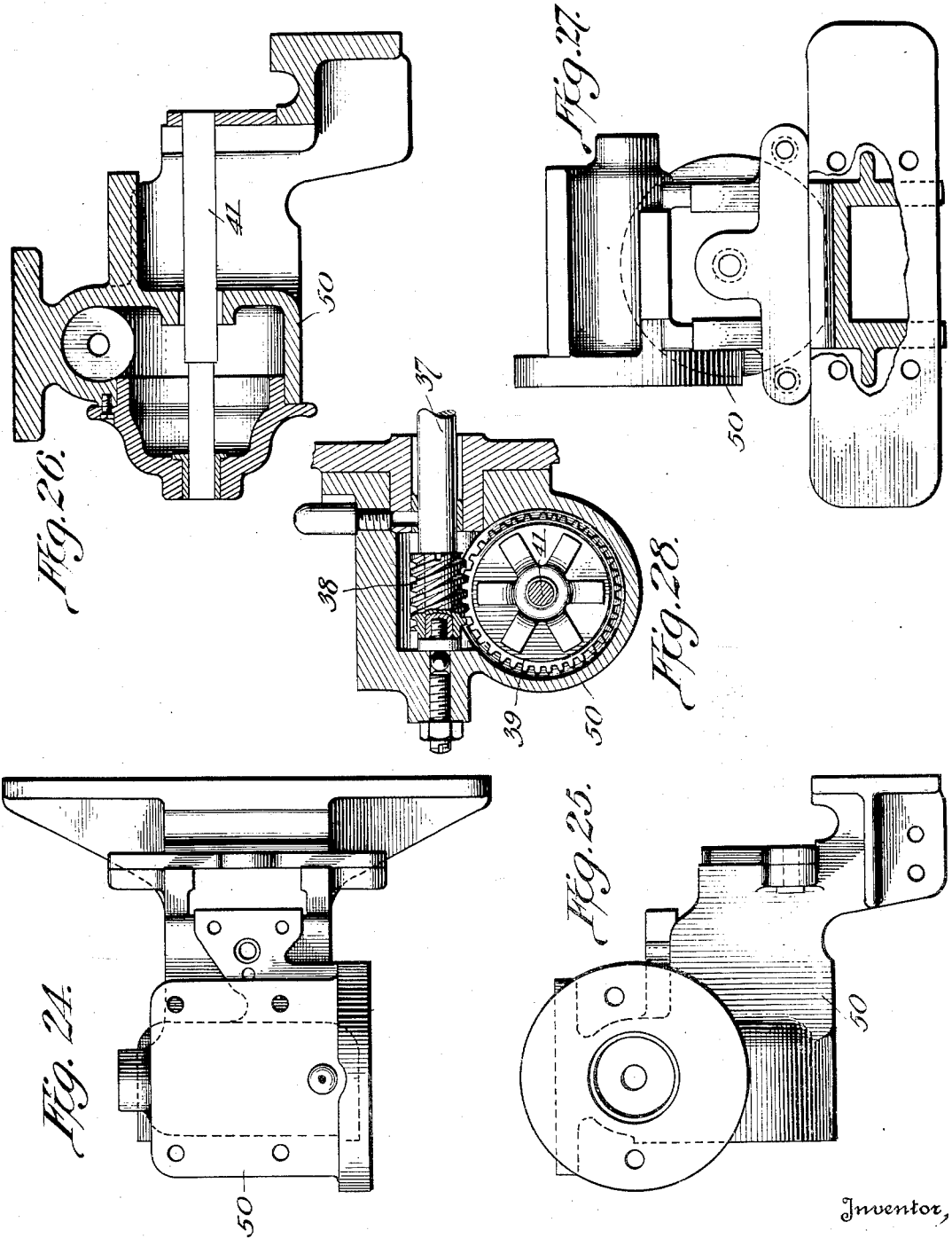

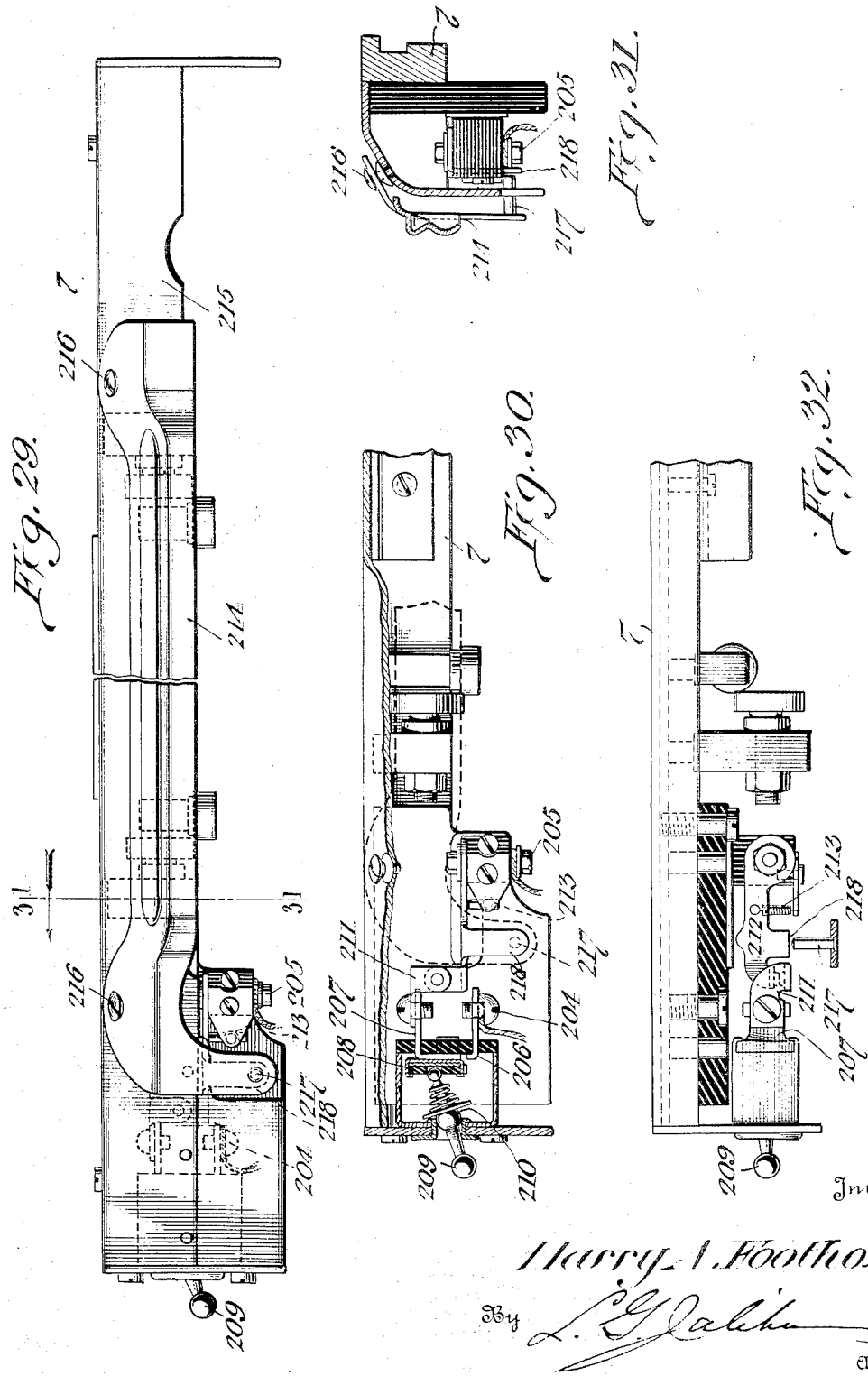

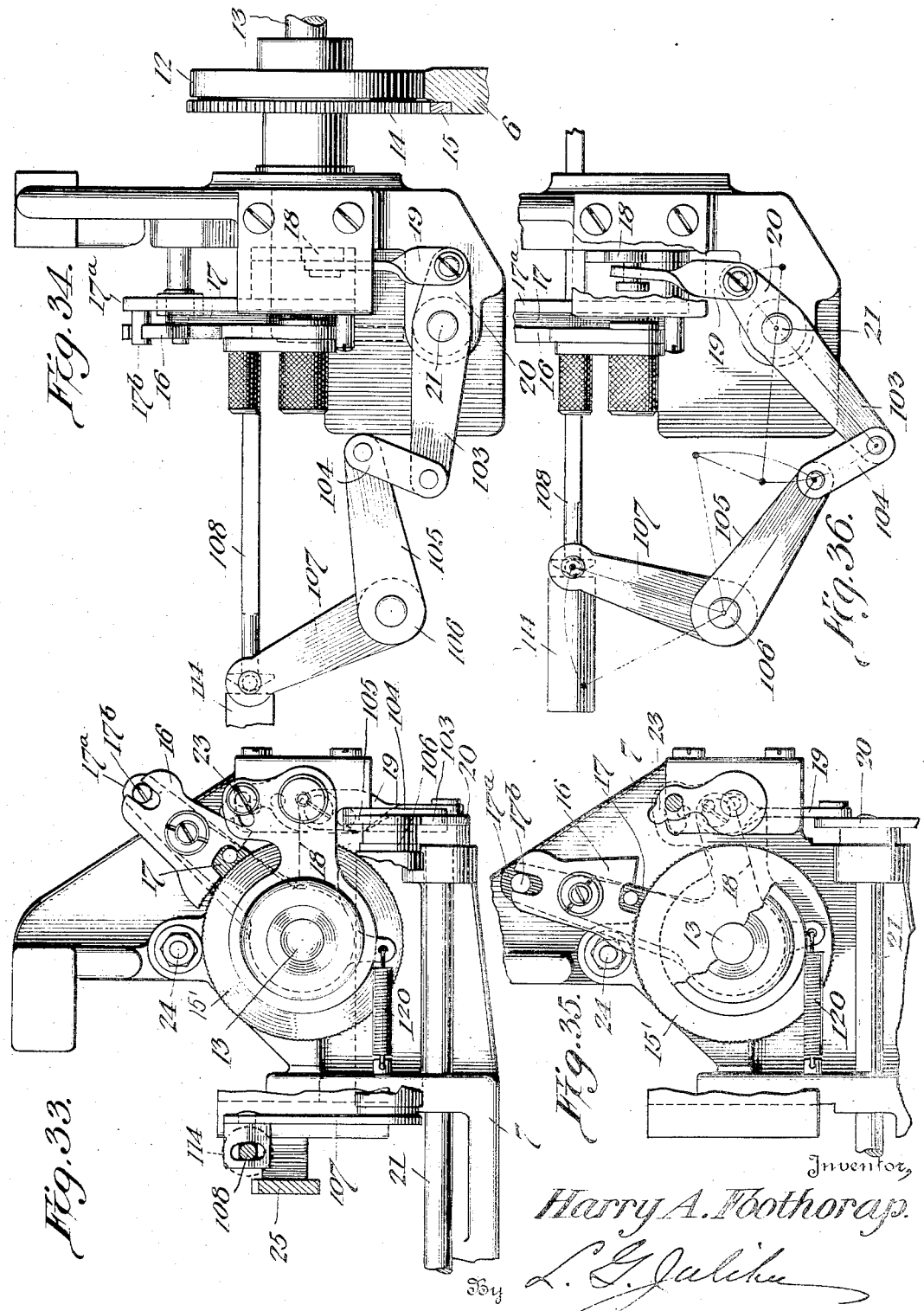

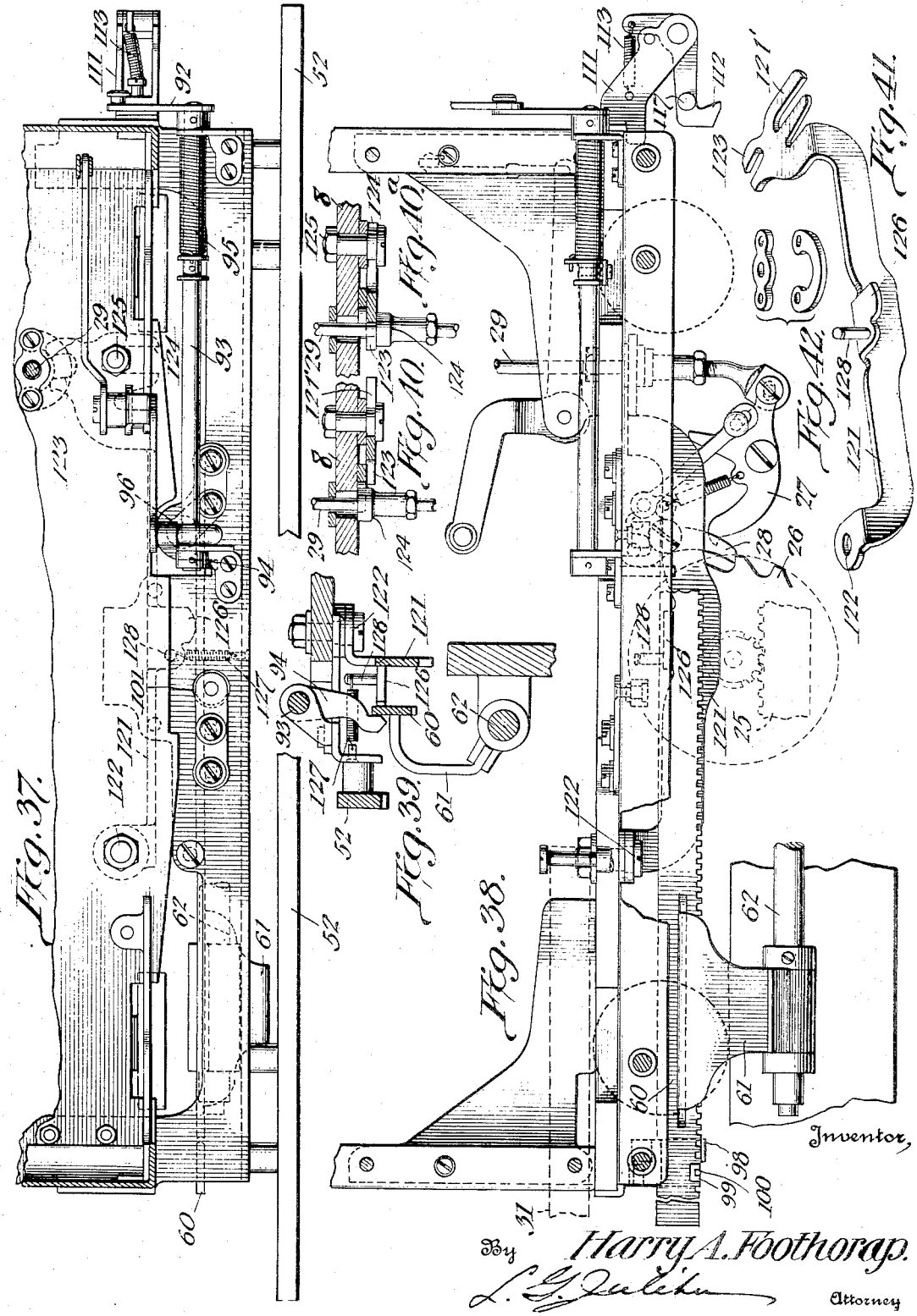

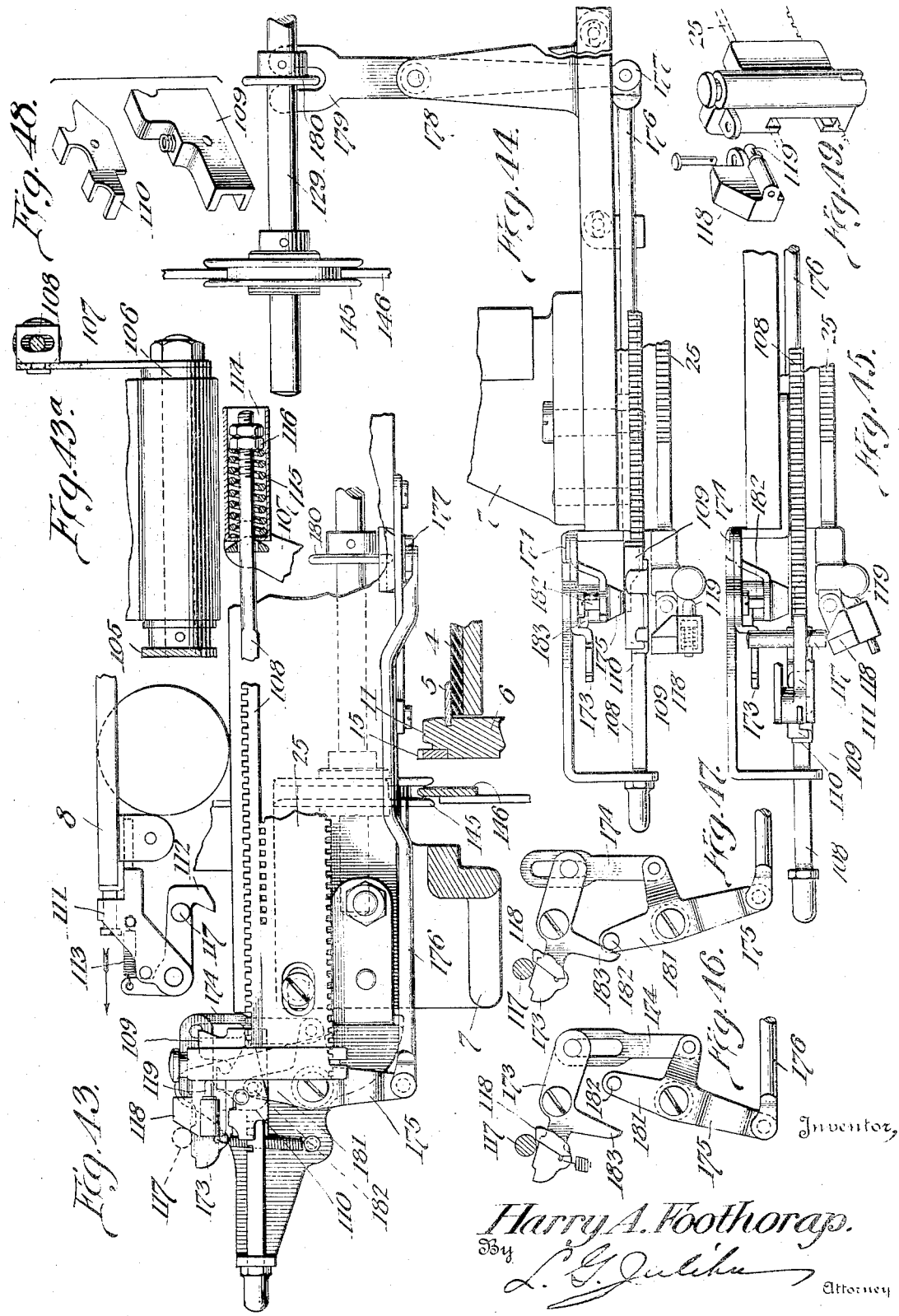

April 18, 1933.  H. A. FOOTHORAP  1,904,127
AUTOMATIC ELECTRIC WRITING-COMPUTING MACHINE
Filed Sept. 13, 1926    17 Sheets-Sheet 13
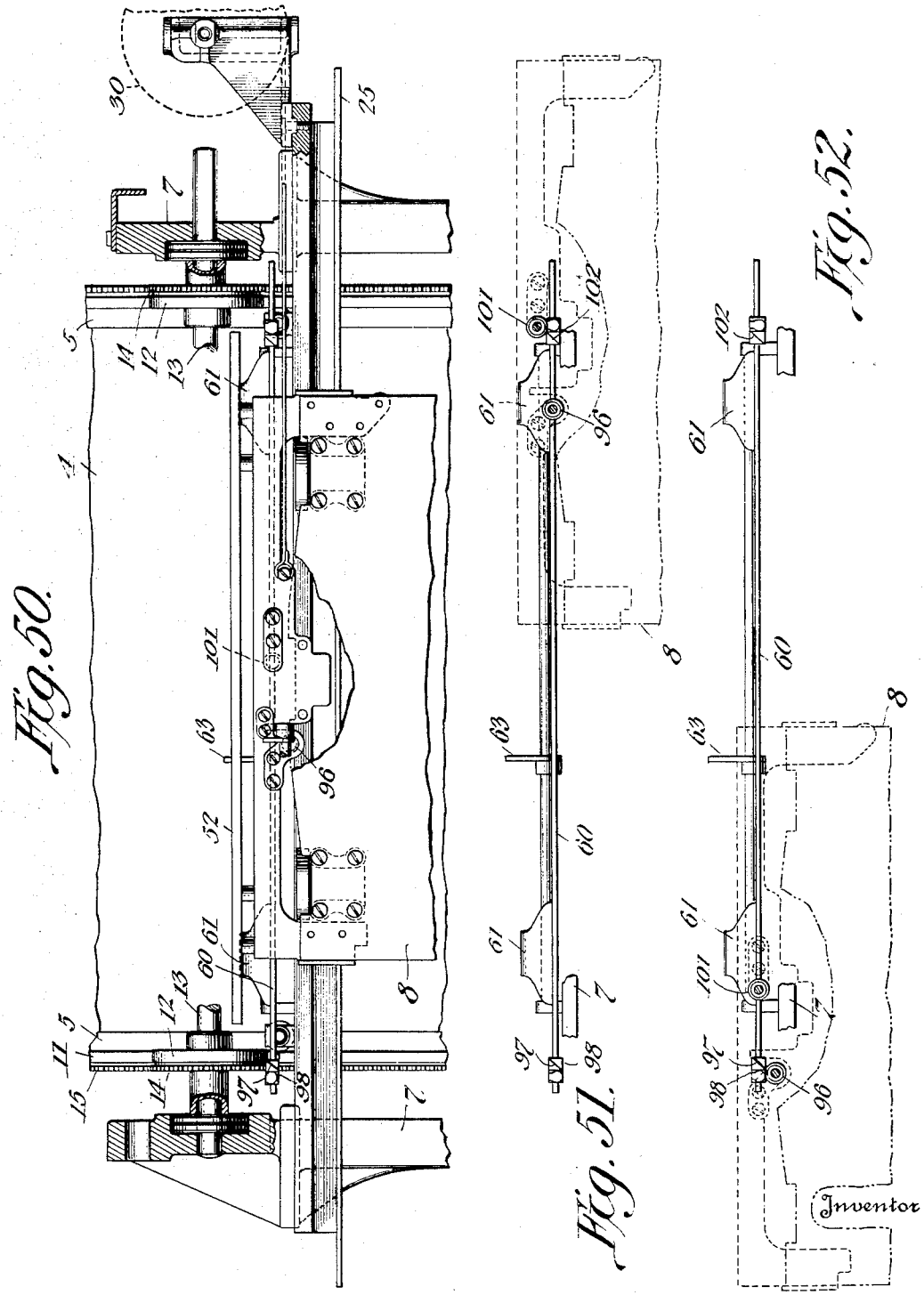

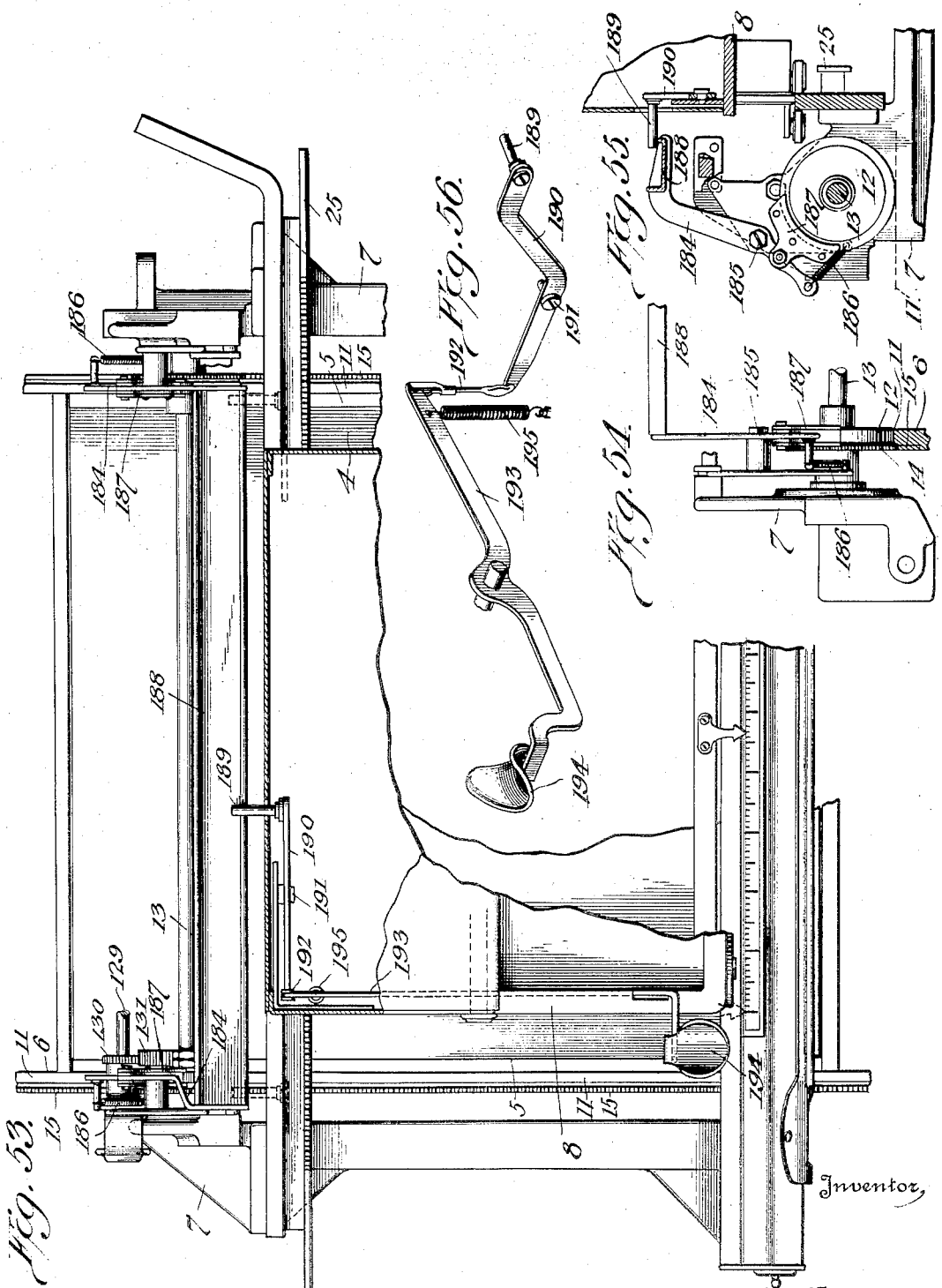

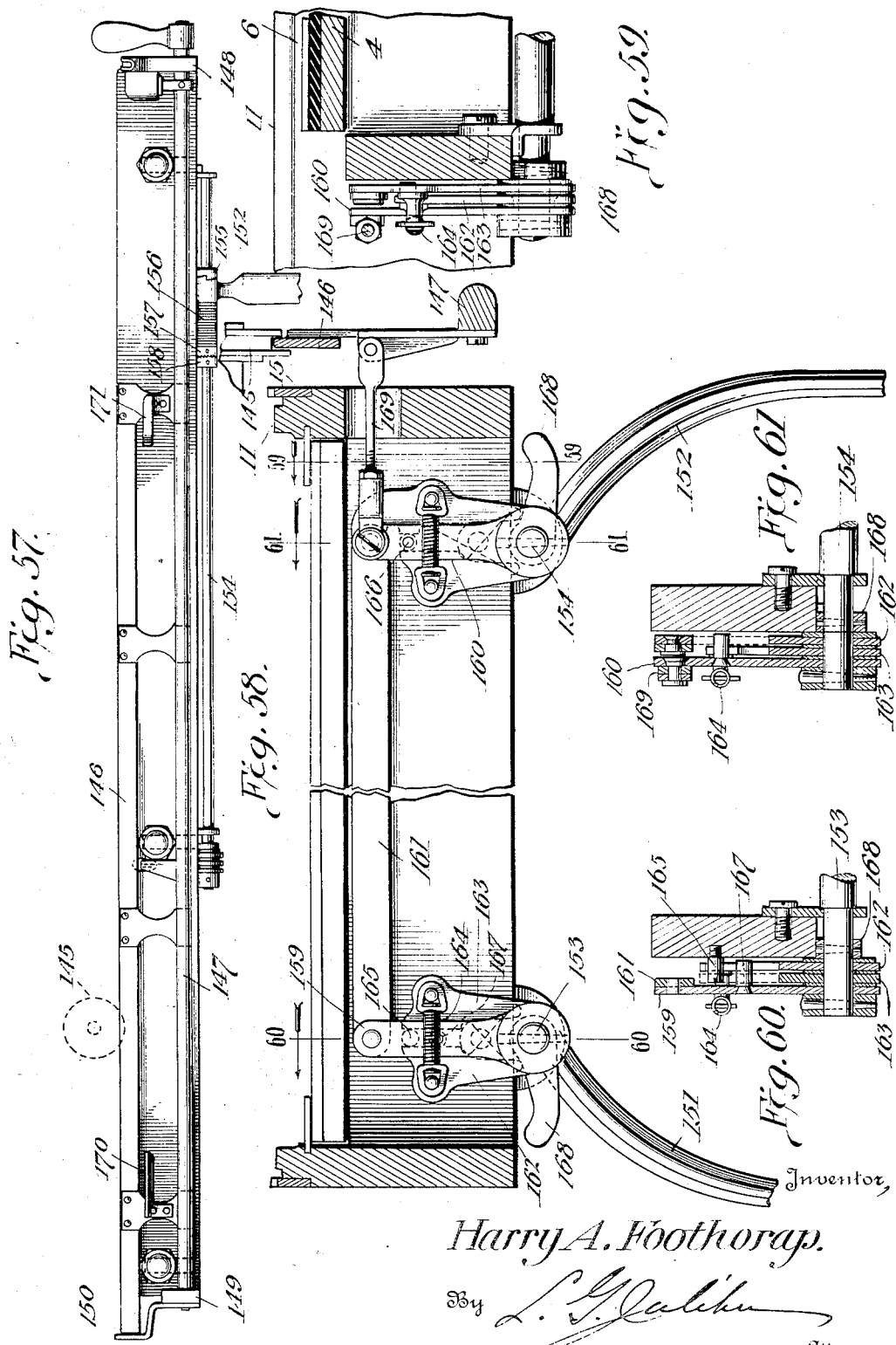

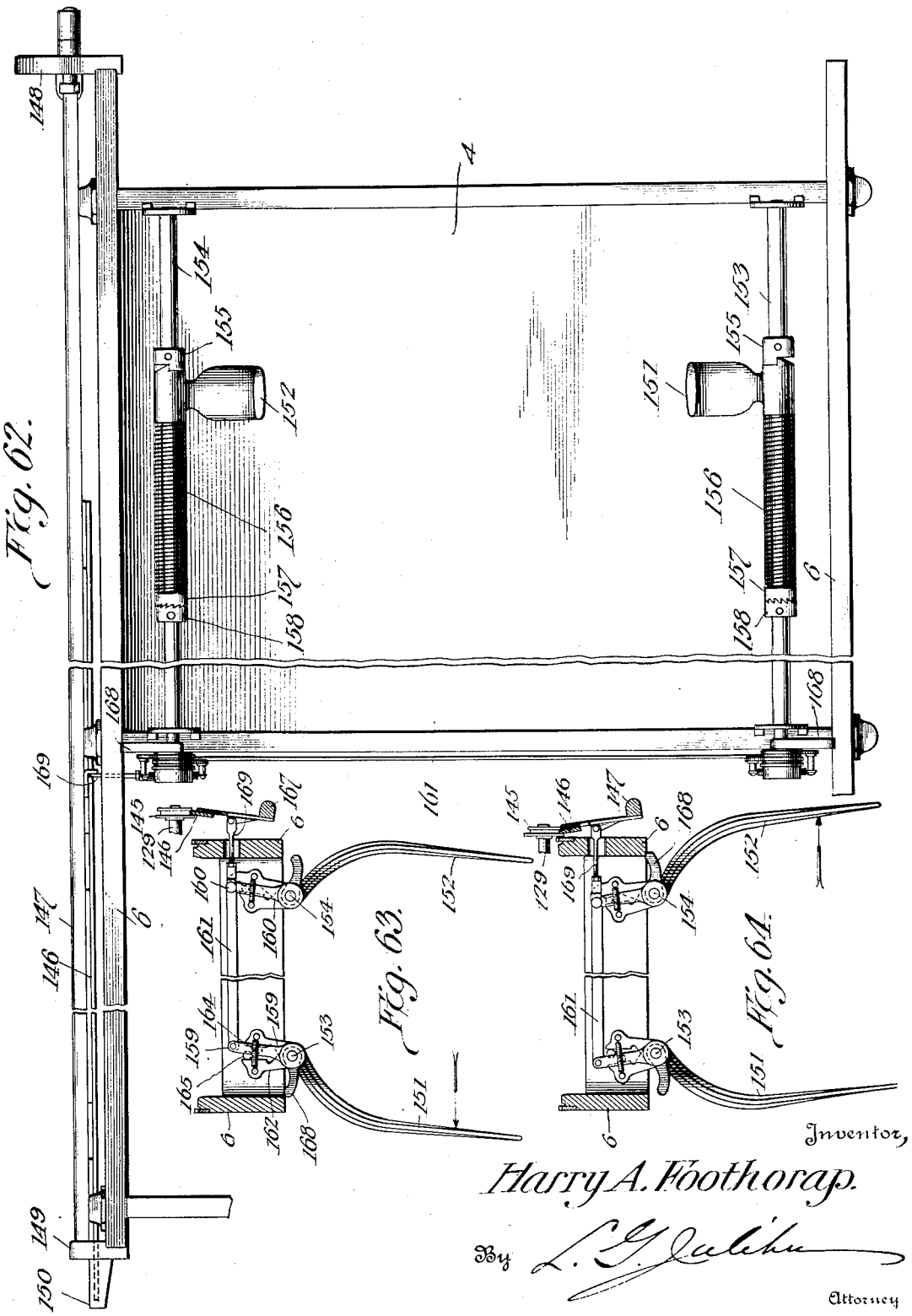

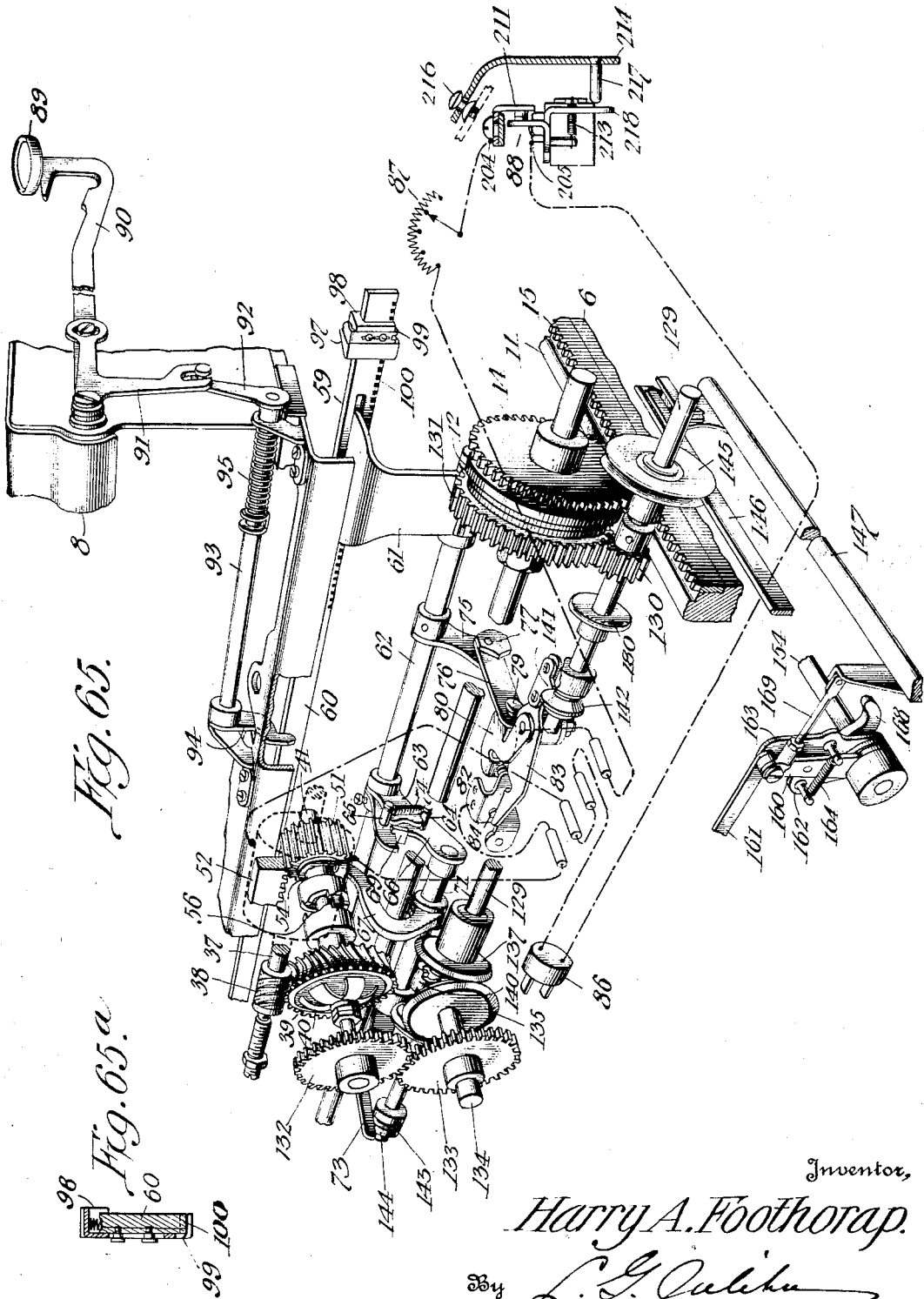

Patented Apr. 18, 1933

1,904,127

UNITED STATES PATENT OFFICE

HARRY A. FOOTHORAP, OF HARRISBURG, PENNSYLVANIA, ASSIGNOR TO ELLIOTT-FISHER COMPANY, A CORPORATION OF DELAWARE

AUTOMATIC ELECTRIC WRITING-COMPUTING MACHINE

Application filed September 13, 1926. Serial No. 135,210.

This invention relates to an automatic electric writing-computing machine, its general object being to eliminate as many manual operations as possible in the use of the machine and to substitute therefor motor operations under automatic control.

A more specific object of the invention is to provide motor driven mechanism controlled both manually and automatically to move the printing mechanism freely in both directions transversely of the platen and also in both directions longitudinally of the platen to secure quick positioning thereof, as well as step by step to line and letter space the record.

Another object is to make the letter space advance of the carriage for the printing of a record, its return to a predetermined starting point and its advance a predetermined distance for line spacing, dependent solely upon the operation of the recording keys.

Another object is to cushion the return movement of the carriage to prevent undue shock or jar when it reaches its fully returned position.

Another object is to place the motor operated movement of the machine back and forth over the platen under the convenient control of the operator without requiring the removal of the hands from the keyboard or from the manipulation of the work elements incidental to their displacement, replacement or adjustment.

Another object is to automatically control the line space lock to prevent overrunning of the line space movement, but to permit the movement of the machine forward or backward without interference by the lock.

Another object is to automatically arrest the movement of the machine at predetermined points without attention from the operator.

A still further object is to provide automatic safety control of the machine for effecting its arrest in the event that it comes into inadvertent contact with the hand of the operator engaged in manipulating the work sheets.

Many additional objects subordinate to those enumerated will hereinafter appear as the description of the illustrated embodiment of the invention is developed.

Figure 1 is a perspective view of an Elliott-Fisher machine equipped in accordance with my invention.

Figure 2 is a perspective view from a different angle of the same machine equipped with computing mechanism.

Figure 3 is a side elevation of the machine and platen frame.

Figure 4 is a plan view of a portion of the platen and its frame.

Figure 7 is a horizontal section on the line 7—7 of Figure 5.

Figure 8 is a vertical section on the line 8—8 of Figure 5.

Figure 9 is a detail view of the carriage return clutch and associated parts in normal position.

Figures 5, 6:
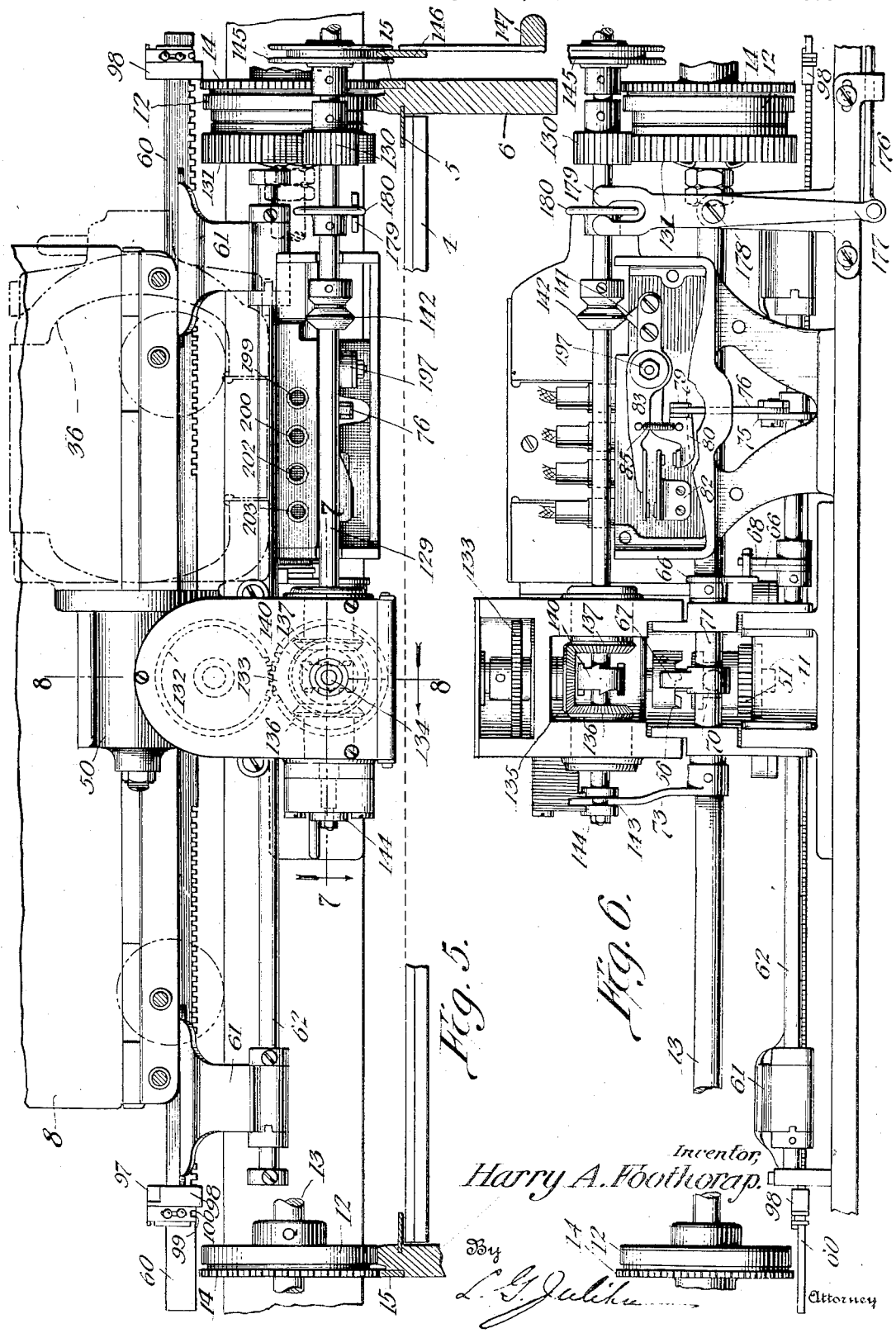
Figure 5 is a rear view of a portion of the machine with parts in section.
Figure 6 is a bottom plan view of the subject matter of Figure 5.

Figure 9ª is a detail elevation of a portion of the clutch operating mechanism shown in Figure 9.

Figure 10 is a view similar to Figure 9 with the clutch in operative condition.

Figure 11 is a detail perspective view of the carriage return control shaft and associated parts.

Figure 12 is a detail group of a portion of the motor clutch.

Figure 13 is a plan view of the switch block.

Figure 14 is a longitudinal sectional view of the same.

Figure 15 is a rear elevation of the switch block and associated parts.

Figure 16 is a detail view of the frame drive shaft and the control mechanism associated therewith, the parts being shown in normal position.

Figure 17 is a similar view with the shaft moved by the frame control bail, the control mechanism operated to close the circuit through the motor for the driving of the frame, and the safety arm of the carriage return control mechanism locked against operation.

Figure 18 is still another view of this group with the frame drive shaft shifted in the opposite direction which likewise closes the circuit through the motor and locks out the safety arm.

Figure 19 is a detail section showing the mechanism controlling the motor circuit by the carriage return bail.

Figure 20 is a detail section on the line 20—20 of Figure 19.

Figure 21 is a similar view of the parts in position to close the circuit through the motor for the purpose of inaugurating the carriage return.

Figure 22 is still another view showing the provision made for excess movement of the parts after the contact has been made.

Figure 23 is a plan view of the circuit closers at the point of operation shown in Figure 21.

Figure 24 is a plan view of the housing for the carriage return gearing.

Figure 25 is an elevation of the same.

Figure 26 is a section of the housing when the machine is equipped merely for the motor operation of the carriage and omitting the mechanism concerned with the motor driven frame.

Figure 27 is an elevation of the housing shown in Figures 24 and 25.

Figure 28 is a sectional view showing the relation between the motor shaft and the motor clutch.

Figure 29 is an elevation of the front rail of the machine with the safety bail mounted thereon.

Figure 30 is a sectional view of the switch and associated parts.

Figure 31 is a section on the line 31—31 of Figure 29.

Figure 32 is a horizontal section of the switch.

Figure 33 is a side elevation of the line space mechanism.

Figure 34 is a rear elevation of the same.

Figure 35 is a view similar to Figure 33 with parts broken away and showing the positions assumed by the parts at the end of the line space stroke.

Figure 36 is a view similar to Figure 34 but with parts positioned in correspondence with Figure 35.

Figure 37 is a sectional view of the rear portion of the carriage showing the escapement lock to prevent the operation of the escapement during the carriage return.

Figure 38 is a rear elevation of the subject matter of Figure 37.

Figure 39 is a detail section showing the relation of the escapement lock to the carriage return bail.

Figures 40 and 40ª are detail views of the escapement lock in inactive and active positions.

Figure 41 is a detail perspective view of the escapement locking arm.

Figure 42 is a detail group of the spacing plates for the escapement lock.

Figure 43 is an elevation of a portion of the frame and carriage showing more particularly the automatic line spacing mechanism, mechanism for unlocking the line space mechanism to permit movement of either the carriage or the frame and the mechanism for cushioning the return movement of the carriage.

Figure 43ª is a detail view of a portion of the line space bell crank.

Figure 44 is a plan view of a portion of the structure shown in Figure 43 with the parts occupying the positions they assume normally or prior to the carriage return.

Figure 45 is a similar view with the parts in the positions occupied thereby prior to the complete return of the carriage.

Figure 46 is a detail showing the two instrumentalities for elevating the line space hook either when the carriage moves forward or when the frame control mechanism is operated.

Figure 47 is a similar view with the parts in different positions.

Figure 48 is a detail view of the line space block and its latch.

Figure 49 is a view of the carriage stop and its hook operating cam.

Figure 50 is a plan view of a portion of the machine designed more particularly to show the mechanism for effecting the automatic control of the carriage return and the automatic control of the motor in connection therewith.

Figure 51 is a more or less diagrammatic view of the carriage return bail and its operating rollers, the parts being positioned for the return of the carriage indicated in dotted lines.

Figure 52 is a similar view showing the carriage at or near its opposite limit of movement and the motor cut out.

Figure 53 is a plan view, partly in section, of the frame and carriage showing more particularly elements of the frame brake.

Figure 54 is a rear elevation of the brake and adjacent parts.

Figure 55 is a side elevation of the subject matter of Figure 54.

Figure 56 is a detail of the brake key and associated parts.

Figure 57 is a side elevation of the platen frame showing more particularly the frame control bail and associated parts.

Figure 58 is a sectional view of the platen frame, the frame control bail and associated mechanism.

Figure 59 is a section on the line 59—59 of Figure 58.

Figure 60 is a section on the line 60—60 of Figure 58.

Figure 61 is a section on the line 61—61 of Figure 58.

Figure 62 is a bottom plan view of a portion of the platen and platen frame showing more particularly the elements of the knee control of the frame movement.

Figures 63 and 64 are reduced views showing the action of the knee operated frame control levers.

Figure 65 is a perspective view more or less diagrammatic of a major portion of the carriage and frame operating and control mechanism.

Figure 65ª is a detail section of one of the adjustable cams.

General machine organization

The machine illustrated in the drawings and with which this development is more directly concerned, is what is known to commerce as the Elliott-Fisher machine. In its basic characteristics, it is what is known as a flat platen typewriter developed in several directions to facilitate work of varied classes; for instance, book writing, by which is meant writing in bound books; billing, or the making of multiple entries or postings on bills simultaneously with the production of various incidental commercial records; and bookkeeping, embracing posting, and proof securing operations which involve the recording of the necessary data on a variety of work sheets and the computing of subtotals, column totals, grand totals and the difference between certain totals through the instrumentality of computing mechanism with which the machine is equipped for this purpose. In all developments of the machine, however, the basic organization of a flat platen typewriter is found.

Referring more particularly to Figure 1, 1 indicates a pedestal or other support usually equipped with shelves 2 and supporting a rectangular platen frame 3 within which is mounted a flat platen 4 usually having limited vertical movement toward and from paper clamps 5 secured to the side rail 6 of the frame 3. Mounted to travel over the platen longitudinally of the platen frame is a line space frame 7 on which is mounted to travel transversely of the platen, a letter space carriage 8 on which is assembled the usual printing mechanism 9 operated by keys 10, it being understood that the carriage 8 also supports the various ancillary mechanisms of a typewriter necessary to the step by step control of the carriage, its release for free movement, ribbon mechanism, tabulating mechanism, etc. While the frame 7 is equipped with suitable line spacing mechanism, it will be obvious that what is known as the machine head consisting of the frame 7 and the carriage 8 may also be freely shifted back and forth on the platen frame 3 to any desired position over the platen, to any line space position required, or to a position on the frame 3 in rear of the platen. The printing mechanism thus located by the movement of the frame 7 in any line position, may travel step by step or otherwise with the carriage 8 to letter space the printed record.

The frame 7 is variously known in the art as the carriage frame (because it is the frame which supports the travelling carriage), the line space frame (because it is advanced from line to line), or the head frame (because it is the frame of the head or machine head which includes the entire traveling structure), but for convenience of description, I shall employ merely the term "frame" by which it will be understood the frame 7 is meant when used without modification.

The upper edges of the frame members 6 constitute tracks or guides 11 on which travel frame supporting rollers 12 secured to the line space shaft 13 of the frame 7 and associated with gears 14 meshing with racks 15 at the upper outer edges of the frame bars 6. This arrangement provides a roller mounting for the frame, but secures the necessary traction between the frame 7 and the platen frame.

Associated with the line space shaft 13 is manually operated line spacing mechanism such as is shown in my Patent #1,275,413 and illustrated in Figures 33 to 36 of these drawings which show, in addition, certain elements of the automatic line spacing mechanism which is an element of the present development.

Referring, now, however, to the manually operated line spacing mechanism shown substantially in the patent aforesaid, the line space wheel 15' having a knurled periphery is fixed to one end of the line space shaft 13 and is engaged by a pivotal line space pawl 16 mounted on a swinging pawl carrier 17. Mounted adjacent to the pawl carrier 17 is a driving arm 17ª having a pin 17ᵇ engaging the bifurcated upper end of the pawl 16 and also having an arm 18 connected by a link 19 to an arm 20 extended from a line space rock shaft 21 afforded suitable bearings in the frame 7 and provided at its front end in advance of said frame with a line space lever or key 22 by means of which the shaft 21 may be rocked to swing the driving arm 17ª and cause the pawl 16 to engage and advance the knurled wheel 15. It will be noted that the throw of the line space pawl 16 and consequently the extent of the line space movement of the frame is regulated by a variable stop mechanism 23, also that the forward throw of the line space pawl is limited by a stop 24 and that when the throw of the pawl is complete, it serves to absolutely lock the knurled wheel 15 against further rotation and thereby insures the locking of the frame in proper line space position and prevents it from overrunning when the line spacing mechanism is operated at high speed.

Another element of the general machine organization which must be generally understood in order to comprehend the present development, is the carriage feeding mechanism. This mechanism is shown in my Patent #1,203,519 and includes the carriage feed rack 25 (Fig. 38) to which the carriage feed pinion is geared. This pinion (not shown) is fixed to rotate with the carriage escapement wheel 26, indicated in Figure 38, controlled by escapement dogs 27 and 28 operated from the universal bar of the machine through the usual draw wire 29. When the keys are depressed, the carriage is advanced, when permitted, by the usual spring drum 30 connected to the carriage by the tape 31.

In those forms of the machine intended for both writing and computing, such as is shown in Figure 2, a register bar 32 is mounted on the frame 7 in rear of the carriage to support any number of registers 33 having any desired location along the bar and operated by actuating mechanism 34 mounted on the carriage and including numeral keys. In addition to the registers 33, a cross-footing register 35 is sometimes mounted on the carriage and operates for both addition and substraction selectively in any desired column positions. The structure thus far described is usual and well known and, as will be seen, embraces a stationary frame structure in which is mounted a flat platen for the support of the work in a flat spread out condition and on which is mounted a frame, freely movable back and forth over the platen or step by step for line spacing, and supporting a carriage which is movable transversely of the platen under the power of a spring motor and under the control of printing mechanism so that the carriage advance for letter spacing is an incident of the recording operation. I will now proceed with the description of the various mechanisms constituting the present development of the described machine.

*The automatic carriage return*

The carriage return mechanism is motor operated and manually and automatically controlled. If desired, this mechanism may be set to automatically return the carriage from any predetermined point, or the depression of a key may cause the carriage return at any time regardless of the position of the carriage.

Mounted on the frame 7 in rear thereof is an electric motor 36 wired, as by a trailer cable 36ª, to a light socket or other source of electrical energy. The motor shaft 37 is provided with a worm 38 meshing with a worm gear 39 connected by a slip clutch 40 to a carriage return shaft 41. The function of the clutch 40 is to determine the maximum mechanical resistance to be opposed at any time to the motor. This clutch may be of any suitable form, but preferably the worm gear 39 is mounted to rotate on the hub of a friction disk 42 fixed to the shaft 41 and coupled to a second frictional disk 43 by lugs 44 engaging notches 45 in the hub of the disk 42. (See Figs. 8 and 12.). The worm gear 39 is frictionally interposed between the friction disks 42 and 43, the holding power of the clutch, and hence the maximum resistance to the motor, being regulated by a spring spider 46 bearing against the disk 43 and backed by an adjusting nut 47 carried on the shaft 41 and backed by a lock nut 48. The shaft 41 is afforded suitable bearings in the gear casing 49 attached to the motor casing 50 and adjacent to one end is provided with a freely rotatable carriage return pinion 51 meshing with carriage return rack 52 on the carriage and having its hub 53 formed with an annular groove 54 and its end face provided with clutch teeth 55. The end of the hub 53 thus constitutes one element or member of the carriage return clutch indicated as a whole by 56, the other member 57 of which is fixed to the shaft 41 and provided with teeth 58 to be engaged by the teeth 55. This engagement is accomplished by the movement of the pinion 51 longitudinally of the shaft 41, the toothed portion of the pinion being of sufficient width to maintain at all times a proper gear connection with the rack 52 on the carriage.

Normally the carriage return clutch is open and the motor is de-energized. When the return of the carriage is to be effected, the clutch 56 is closed and the motor circuit is also closed so as to mechanically connect the motor with the carriage return shaft and to energize the motor.

*The carriage return control*

The primary element of the carriage return control is a carriage return bail 59 including a control bar 60 carried by arms 61 extended upwardly and forwardly from a shaft 62 (see Fig. 65) from which extends rearwardly an arm 63 which moves vertically as the control bar of the bail is moved back and forth in a manner to be described. The end of the arm 63 is interposed between two spring urged pins or projections 64 and 65, one of which extends from the driving arm 66 of a clutch shifter 67 and the other of which extends from a latch 68 loosely mounted on the shaft 62 and normally engaging a projection 69 on the arm 66. (See Figs. 9, 10, 11 and 65.) The upper end of the shifting arm 67 is provided with a roller 70 which extends into the annular groove 54 of the member 53 of the carriage return clutch 56 and the arms 66 and 67 are both fixed to a shaft 71 afforded suitable bearings and also having fixed thereto a safety arm 73 extended rearwardly therefrom in a substantially horizontal position and serving to prevent the operation of the carriage return mechanism under certain conditions to be hereafter explained.

Referring now more particularly to Figures 9 and 10, the first of which shows the normal or inoperative position of the carriage return mechanism and the latter the operative or active condition thereof, it will be noted that in the normal position of the control bar 59 of the carriage return bail, the latch 68 will be held in engagement with the driving arm 66 by the spring 74 interposed between these elements, and the carriage return clutch 56 will thus be held open. (Fig. 9.) If, however, the control bar 59 is moved forward, the swinging of the bail and the rocking of the shaft 62 will cause the arm 63 to engage the pin 65 and swing the latch 68 out of engagement with the driving arm 66. When the driving arm has been released from the latch, the force exerted by the spring 74 will be sufficient to swing the driving arm to rock the shaft 71 and cause the shifter 67 to close the carriage return clutch 56 and thus connect the carriage return pinion 51 to the motor. (Fig. 10.)

In the reverse operation, if the control bar is moved back from the position shown in Figure 10 to the normal position shown in Figure 9, the arm 63 by engagement with the pin 64 will reverse the movement of the driving arm 66 and recede from the pin 65 extending from the latch 68. This movement will cause the shifter to throw out or open the clutch 56 and the parts will be locked in this position by the snapping of the latch 68 into its engaging position.

The movement of the control bar 60 also controls a circuit closer for the motor. Extended from the shaft 62 (Figs. 19 to 23 and Fig. 65) is an arm 75 connected to a fibre or other insulating link 76 by an adjustable eccentric connection 77 which permits a nice adjustment of the link 76 necessary to the accurate timing of the circuit closer. A slot 78 in the end of the link 76 receives a headed stud 79 on the contact arm 80 of the carriage return circuit closer 81, the other element 82 of which is also designed to be engaged or contacted by the contact arm 83 of the second circuit closer 84 for the frame drive to be hereafter mentioned. The arms 80 and 83 are drawn toward the contact member 82 by a spring 85 common to both.

Normally, that is to say when the control bar 60 is in the position shown in Figure 21, the arm 80 will be held out of engagement with the contact 82 by the link 76 in opposition to the urge of the spring 85. When, however, the bar 60 is moved forward, the swinging of the carriage return bail will allow the link 76 to move rearwardly and the spring 85 will close the circuit closer 81, thus closing the motor circuit to energize the motor for the control of the carriage, it being understood, of course, that, as shown diagrammatically in Figure 65, one side of the motor is wired to the contact element 82 and the other side to both of the arms 80 and 83 with a contact plug 86, a rheostat 87 and a switch 88 in the line. On the return of the carriage return bail, the described operation is reversed and the link 76 opens the circuit closer 81. Obviously, as the forward swinging of the carriage return bail connects the motor mechanically through the clutch 58 to the carriage return pinion 51 in constant engagement with the rack 52 and energizes the motor by closing its circuit, the return of the carriage to its starting point in opposition to the spring drum 30 will be effected by the motor. The bail 60, as stated, is the primary element of the carriage return control, but this bail is actuated automatically and manually so that the carriage will be returned automatically when it reaches a given set position, but may be sooner returned by the motor upon the mere depression of a key.

*The carriage return key*

This motor control key 89, known as the carriage return key, is mounted on the key lever 90 fulcrumed at one side of the carriage casing (Fig. 65) and is arranged to operate a bell crank 91 which in turn operates a crank 92 at the adjacent end of a shaft 93 fulcrumed in suitable bearings on the carriage and having an arm 94 depending behind the control bar 60 and traveling along the same with the carriage to constantly maintain the operative relation between the key 89 on the carriage and the carriage return bail mounted on the frame. Upon depression of the key 89, the shaft 93 will be rocked to cause the arm 94 to swing the carriage return bail 60 forwardly for the purpose of energizing the motor and closing the carriage return clutch to cause the return of the carriage in the manner already described. Upon the release of the key 89, the several elements of the connection between it and the control bar 59 will be returned to normal position by a spring 95. This retraction, however, will be idle and will not be accompanied by any reverse movement of the carriage return bail which will be held in the forward position to which it has been moved (Fig. 10) by the spring 74 which will hold the clutch 56 in engagement and the arm 63 in its elevated position until the carriage return bail is positively moved back to open the motor circuit and the clutch 56. It may be stated at this point that the timing of these operations, to-wit, the opening and closing of the motor circuit and the opening and closing of the carriage return clutch may be relatively timed to secure the best operating condition.

The automatic carriage return control

Since the retraction of the carriage return key 89 does not effect the retraction of the carriage return bail to cut out the carriage return mechanism, it is obvious that some other means must be employed for this purpose. Mounted on the carriage (see Figs. 50 to 52) is a roller 96 which, as the carriage approaches the end of its return movement, engages the cam 97 formed on the block 98 adjustably retained on the control bar 59 of the carriage return bail by a spring urged latch 99 (Figs. 5, 65 and 65ª) engaging teeth 100 formed in the under side of the bar. Upon the engagement of the cam 97 by the roller 96, the carriage return bail will be cammed back to its normal position to open the motor circuit and the carriage return clutch in the manner already described.

The provision for the adjustment of the cam 97 makes it possible to vary the point in the carriage return movement at which it will operate in order to secure the smoothest possible arrest of the carriage, the point at which the motor is thrown out of action depending, of course, upon the momentum of the carriage under the impulse of the motor and the resistance opposed to further return movement of the carriage by the spring 30 after the motor is cut out. It may be noted in passing that the shock of the carriage return is materially reduced by the action of the spring drum to overcome the momentum of the carriage in its return movement.

Another element of the automatic carriage return control serves to initiate the return of the carriage if the carriage return key has not been operated before the carriage reaches a predetermined position in its forward advance. This element embraces a second roller 101 movable with the carriage and engaging a carriage return cam 102 similar to the cam 97, but reversed and adjustably mounted at the other end of the bar 60. In Figure 51, the roller 101 has just passed over the cam 102 to swing the carriage return bail forwardly for the purpose of closing the motor circuit and the carriage return clutch and inaugurating the automatic return of the carriage by the motor. It will thus be seen that the carriage return movement may be inaugurated either by the manual operation of the key 89 or by the automatic operation of the roller 101 and cam 102. Also, it may be noted that regardless of whether the carriage return is initiated automatically or manually, the motor will be cut out both mechanically and electrically after it has performed its function as a carriage return motor.

The automatic line space

Another feature of this development is automatic line spacing mechanism operative to advance the machine over the platen one line space of selected width as the carriage is returned to begin a new line of writing. We have seen that the frame 7 may be line spaced a distance predetermined by the adjustment of the stop 23 (Fig. 33) upon the rotation of the shaft 21 by the key 22. I, therefore, provide mechanism operated by the carriage on its return, to similarly rotate the shaft 21 to secure the line spacing automatically.

This automatic line spacing mechanism includes an arm 103 extended from the shaft 21 (Fig. 34) and connected by a link 104 to one arm 105 of a bell crank 106 having an upstanding arm 107 connected to a toothed draw bar 108 (Fig. 43) slidable in suitable guides on the frame 7. Mounted on this draw bar adjustably is a block 109 retained by a spring urged latch 110 which engages an interdental space of the draw bar. In a suitable bracket 111 at one side of the carriage 8 is a hook or coupling member 112 yieldingly retained in normal position by a spring 113 and movable with the carriage in a path obstructed by the block 109 on the draw bar. As the carriage approaches the limit of its return movement, the hook 112 engages the block 109 thus coupling the carriage to the draw bar which then moves with the carriage and swings the bell crank 106 to operate the line spacing mechanism. Since the line spacing is variable and since sufficient movement of the draw bar 108 must be provided for maximum spacing a yielding connection is effected between the draw bar and the arm 107. (Fig. 43.)

Attached to the arm is a spring casing 114 enclosing a spring 115 encircling the draw bar 108 and confined between the end of the casing and a nut 116 screwed on the draw bar. This spring is sufficiently strong to operate the line spacing mechanism under the pull of the draw bar and will then yield to accommodate excess movement of the bar. It may be here noted that this spring 115, as well as the spring drum, opposes the final return movement of the carriage and aids in cushioning its arrest.

We have seen that when the frame has been line spaced, it is securely locked by the line spacing mechanism against overrunning. It is desirable, however, to promptly release the frame after it has been accurately positioned for a new line, since such line may be very short or it may be desired to further line space the machine before writing. To insure this prompt retraction of the line spacing mechanism (Figs. 43 to 49) the hook 112 is provided with a lifting pin 117 which, as the carriage comes to rest, cams back a pivoted cam block 118 adjustable on the rear rack of the machine and allows said block to be swung in front of it by a spring plunger 119. Slight forward movement of the carriage compared with the carriage movement in the opposite direction which has operated the line spacing mechanism will cause the pin 117 to ride up over the block and lift the hook 112 out of engagement with the block 109 to permit the quick retraction of the draw bar and line spacing mechanism by the spring 115 and the usual retracting spring 120 (Fig. 35) which also contributes to the cushioning of the carriage return if the motor is cut out before or during the line spacing operation.

The escapement lock

It is obviously desirable that the carriage feeding mechanism and more particularly the escapement be locked during the return of the carriage by the motor. I have, therefore, provided a simple form of escapement lock which serves to lock the escapement automatically whenever the carriage return bail is operated.

This lock is in the form of a locking plate 121 pivoted at 122 to the deck of the carriage (see Figs. 37 to 42) and having a horizontally disposed bifurcated locking portion 123 designed to be swung into position to receive the escapement draw wire 29 and to obstruct its upward movement by engagement with a collar 124 on the draw wire. The plate 121 is also provided with a guiding portion 121' engaging a screw 125 so that the locking end of the lever will be properly guided and held in the proper horizontal plane. Intermediate of its ends the plate 121 is formed with a projection 126 extended forwardly as shown in Figure 39 into proximity to the control bar 60 of the carriage return bail 59 and yieldingly retained in normal position by a spring 127 interposed between a fixed part and a pin 128 upstanding from projection 126. Normally the escapement lock occupies the position shown in Figure 37 and the draw wire 29 is free to move and operate the escapement as heretofore explained. When, however, the carriage return yoke 60 is swung forward, the plate 121 will be swung in opposition to the spring 127 to a position above the collar 124, thus locking the escapement against operation and maintaining this condition until the yoke 60 has been swung back to normal position to permit the spring 127 to retract the locking lever.

Thus far the description of the present development has been confined to the instrumentalities which contribute to the motor return of the carriage and the automatic line spacing of the machine whereby when a line has been written, the motor automatically positions the printing mechanism at the beginning of the next line without necessitating any action on the part of the operator or the removal of the operator's hands from the keyboard.

The frame drive

I shall now proceed with the description of that part of the development which comprehends the motor operation of the machine in its movement any desired distance back and forth with respect to the platen, starting from any desired location and stopping at the will of the operator or at selected terminals.

The shaft 13 which, it will be remembered, is geared to the platen frame by the gears 14 and racks 15, is usually called the line space shaft because as stated it is utilized to drive the frame 7 a line space at a time. In this development, however, this shaft constitutes a frame drive shaft since it is the direct driving element for propelling the machine not only for line spacing, but for all movement back and forth to position the machine over the work or to remove it from over the work for displacement, replacement or adjustment thereof. In rear of the frame drive shaft 13 is journaled parallel therewith the frame control shaft 129 having a pinion 130 meshing with a gear wheel 131 on the shaft 13. (Fig. 65.) This control shaft 129 is driven by the motor 36 in either direction to correspondingly rotate the frame drive shaft 13 which drives the frame 7 forward or back on the stationary platen frame.

The connection between the carriage return shaft and the frame control shaft Referring particularly to Figures 7, 8 and 65, it will be seen that the shaft 41 which carries the carriage return pinion 51 at one end is provided at its opposite end with a gear 132 meshing with a similar gear 133 mounted on the stub shaft 134 to the inner end of which is fixed a bevelled gear 135 meshing with two bevelled gears 136 and 137 concentric with the control shaft 129, but rotatable independently thereof in opposite directions. Fixedly secured within the hubs of the gears 136 and 137 are the hubs of clutch members 138 and 139, either of which may be engaged by an intermediate clutch member 140 fixed to the control shaft 129. Normally the control shaft 129 occupies an endwise position which locates the clutch member 140 between and out of engagement with the clutch members 138 and 139 of the gears 136 and 137. By movement of the shaft 129 endwise, however, it may be clutched to either of the gears and driven in either direction accordingly as it is desired to move the machine back or forward.

The frame drive circuit closer control

The control shaft 129 (see Figs. 16 to 18, 23 and 65) is also utilized to control the motor circuit in connection with the frame drive and to this end the contact member 83 (Fig. 23) of the frame drive circuit closer is provided at the side of its pivotal mounting opposite the contact with a pointed control tooth 141 normally engaging a control collar 142 fixed on the shaft 129 and having cam faces 142ª and 142ᵇ which facilitate the repositioning of the tooth 141. Normally the control tooth 141 of the circuit closer is held by the control collar 142 in the position shown in Figures 16 and 23 in opposition to the spring 85 so that the frame drive circuit closer 83 is held open. If, however, the control shaft 129 is moved longitudinally in either direction from its central normal position, the collar 142 will move away from the tooth 141 and thus allow the spring 85 to move the contact member 83 to its contacting position. Therefore, when the shaft 129 is shifted to engage the frame drive clutch for operation in either direction, the circuit will be closed through the motor as will be clearly apparent from what has been said and by reference more particularly to Figure 65. When the control shaft 129 returns to normal position from either shifted position, the collar 142 will cam the tooth 141 back to normal position and thus cut out the motor.

The safety lock

The control shaft 129 justifies its name in still another particular. It serves to determine the conditions under which the carriage return and the frame drive may be inaugurated.

In the normal position of the shaft the frame driving mechanism is inactive since the reversible frame drive clutch 140 is open, therefore, the carriage return may be inaugurated either automatically or manually. If, however, the control shaft is shifted to start the frame drive, an automatic safety lock will prevent the effective operation of the carriage return mechanism.

This safety lock comprises the safety arm 73 (Figs. 11 and 16 to 18) extending from the carriage return control shaft 71 and normally overlying an annular groove 143 in a collar 144 fixed to the frame drive control shaft 129. If the carriage return is started, the movement of the arm 73 necessary to the closing of the carriage return clutch 53 (Fig. 8) is accommodated by the groove 143 and immediately locks the control shaft 129 against endwise movement.

If on the contrary the frame drive is started, the shifting of the shaft 129 and the collar 144 will move the groove 143 out of coincidence with the arm and the collar will block downward movement of the safety arm 73 and thus lock out the carriage return mechanism until the frame movement is terminated by the return of the shaft 129 to normal position. Compare Figures 16 to 18. Either the carriage return or the frame drive may be operated at any time provided only that they may not be operated simultaneously. By omitting the safety lock, it is possible to shift the machine over the platen while returning the carriage but under ordinary conditions the use of the safety lock is preferable.

The manual and automatic frame drive control

We have seen that the frame drive is controlled by the shifting of the control shaft 129 longitudinally. Obviously, this shifting of the shaft must be possible at any point within the limits of travel of the frame 7 on the platen frame. I, therefore, equip the shaft 129 with a peripherally grooved shifting disk 145 which spans the control bar 146 of a frame drive control bail 147 (see Fig. 65) extended along the left hand side of the platen frame (Figs. 4 and 5) and afforded bearings in front and rear brackets 148 and 149 secured to the platen frame. The bracket 149 is bent up to a vertical position beyond the rear end of the bail and constitutes a safety stop 150 for the machine. The bail 147 swings laterally in opposite directions (see Figs. 63 and 64) to shift the control shaft 129 in opposite directions, but normally occupies the central inactive position shown in Figure 58.

The bail 147 is designed to be controlled by the knees of the operator. Knee levers 151 and 152 are therefore mounted to swing from shafts 153 and 154 afforded suitable bearings in the platen frame below the platen adjacent to opposite sides thereof as shown in Figure 62. These knee levers swing freely on the shafts, being arrested in one direction by stop collars 155, but designed to rotate the shafts in opposite directions through the medium of springs 156 connected at their front ends to the knee levers and at their rear ends to clutch collars 157 having rachet toothed engagement with collars 158 fixed to the shafts. The springs 156 serve to cushion the movement of the knee levers and to prevent the abrupt arrest thereof when their functions have been performed.

Fixed to the rear ends of the shafts 153 and 154 are arms 159 and 160 connected at their upper ends by a link 161. Mounted on each of the shafts 153 and 154 is a pair of arms 162 and 163 connected by a spring 164 and normally engaging an intermediate stop pin 165 or 166. The pin 165 associated with the arms at the left side of the platen is a fixed stop extended from a frame bar of the platen frame. The other stop pin 166 associated with the other pair of arms extends from the arm 160. The arm 159 is also provided with a pin 167 extended between the arms of the adjacent pair and the inner one of each pair of arms 162 and 163 is provided with a tail piece 168 as shown in Figures 58, 63 and 64. The upper end of the arm 160 is connected to the control bail 147 by a link 169 which extends through one of the side members of the platen frame. The operation of the knee levers will be obvious from an inspection of the figures of the drawings just referred to, it being noted that when the arms 159 and 160 are swung, one of the adjacent arms will be likewise swung to place the spring 164 under tension since the companion arm will be arrested by a stop. It will now be obvious that the operator by shifting the carriage drive control levers by slight movement of the knees, may swing the control bail 147 and shift the frame drive control shaft 129, whereupon the motor will drive the machine either forward or backward over the platen according to the direction in which the knee levers have been moved. This operation may, therefore, be accomplished while the hands of the operator remain on the keyboard of the machine or are occupied with the manipulation of the work. By allowing the knee levers to resume their normal positions, the movement of the machine whether forward or backward may be terminated at any point desired.

*The automatic cut out for the frame drive*

For the purpose of cutting out the frame drive at the opposite limits of the maximum movement of the machine, the bail 147 is provided with two reversely disposed cams 170 and 171 engaged by a projection 172 depending from the frame 7. When the machine approaches the rearward limit of its movement, the projection 172 will engage the cam 170 to restore the control bail 147 to normal position. Similarly when the machine approaches the forward limit of its movement, the cam 171 is operated by the projection 172 to restore the bail and arrest the machine. Obviously, these stops 170 and 171 may be adjustable along the bail to shorten or lengthen the travel of the machine before it is automatically stopped.

*The automatic line space release by the frame drive control*

Obviously as the return of the carriage locks the frame 7 to the rails through the medium of the line space mechanism, the operation of the control mechanism for the frame drive must effect the unlocking of the frame to permit the latter to move back or forth over the platen. To attain this end without forward movement of the carriage on its frame, the hook 112, which, as we have seen, is in engagement with the block 109 and is holding the line space mechanism in advanced position, must be lifted from the block to permit the latter, the bar 108 and the line space mechanism to snap back to retracted position. To accomplish this purpose a hook lifter or line space lock release lever 173 is fulcrumed on an extension of the frame 7 with its end underlying the rear end of the pin 117 when the carriage is completely returned. The opposite end of the lifter has a slot and pin connection with a link 174 (Figs. 43 to 47) which is in turn connected to one arm of a bell crank 175, another arm of which is connected by a connecting rod 176 to a lever 177 fulcrumed at 178 and having a bifurcated rear end 179 which straddles a flange 180 on the control shaft 129. Extended from the bell crank 175 is an upstanding arm 181 having a pin 182 designed to engage a depending arm 183 of the hook lifter 173. The normal position of the hook lifter is indicated in Figure 43, and it is obvious that if this device is to operate to lift the hook 112 out of engagement with the block 109 whenever the control shaft 129 is moved in either direction to start the frame drive, provision must be made for operating the hook lifter 173 whenever the control shaft 129 is shifted, regardless of the direction in which the shift is made. It will be seen that this provision has been made in the arrangement of parts described. Assuming the parts to be normally located in Figures 43 and 44, movement of the flange 180 to the left will cause the rod 176 to swing the bell crank 175 (see Fig. 47) thus causing the pin 182 by engagement with the arm 183 to swing the lifter 173 in a proper direction to lift the pin 117 and thus withdraw the hook 112 from the block 109 allowing the line spacing mechanism to instantly retract and unlock the frame 7 from the platen frame in time to permit free movement of the latter when the frame drive comes into action. If, on the contrary, movement of the machine in the opposite direction is desired, the movement of the flange 180 to the right in Figure 44 will cause the rod 176 to push the lower end of the bell crank 175, drawing down the link 174 and operating the lifter 173 precisely as described, it being noted that the slot in the link 174 accommodates the movement of the lifter 173 when operated by the pin 172 and that when the lifter is operated by the link, the arm 183 merely moves away from the pin 182.

Thus, it will be seen that the machine locked securely to the platen frame when automatically line spaced upon the return of the carriage, will be unlocked upon the operation of the mechanism which controls the movement of the frame or machine backward or forward over the platen.

*The machine brake*

It is desirable in connection with the motor operation of a ball or roller bearing machine of the character under discussion to provide brake mechanism under the convenient control of the operator. This mechanism while ineffective to prevent proper motor operation is effective to prevent undue overrunning of the machine when the drive is cut out.

Mounted in rear of the carriage is a brake bail 184 fulcrumed at 185 and urged in one direction by springs 186 to bring pivoted brake shoes 187 into frictional engagement with the frame rollers 12. The front bar 188 of the brake bail is of sufficient extent (see Figs. 53 to 55) to permit the engagement therewith of a pin 189 at any point in the travel of the carriage. The pin 189 is carried by a lever 190 fulcrumed at 191 in the carriage casing and connected by a link 192 to the rear end of a brake key lever 193 having at its front end a brake key 194 located at the front left hand corner of the carriage. The rear end of the lever 193 is held depressed by a spring 195 and normally locates the pin at a sufficient elevation to prevent interference with the application of the brake by the springs 186. Thus, the frame brake is normally active, but may be easily thrown out by the depression of the key 194 if and when, for instance, the operator desires to move the machine manually over the platen.

*The circuit closer mounting.*

In Figures 13 to 15, I have illustrated in detail the mounting of the circuit closers.

An insulating block 196 is located below the motor and carries a bolt 197 on which is pivotally mounted the contact member 83 and the member 80 of the circuit closing mechanism. The third contact member 82 (see also Fig. 23) is carried by a screw 198. The bolt 197 is electrically connected by a plate 198 with a socket 199 designed to receive a plug on the line leading back to the rheostat and the switch. The other side of the line is led to the socket 200 electrically connected by the plate 201 to a socket 202 in which is plugged one side of the motor. The other side of the motor is plugged into a socket 203 connected to the contact 82. It is thought that the circuit will be quite clear from a consideration of the described construction in view of the diagrammatic showing of the circuit in Figure 65.

*The switch*

Located adjacent to the forward left hand corner of the frame 7 is a convenient form of switch constituting a primary control for the electrical operation of the mechanism of the machine.

Between the two terminals 204 and 205 are contact plates 206 and 207 spaced to form a gap closed by a circuit closer 208 operated by a switch lever 209 having a spring urged ball bearing 210 constituting a convenient form of mounting which will retain the switch lever in either position. To the plate 207 is attached a contact plate 211 engaged by a circuit breaker 212 held in its engaging position by a spring 213 and connected to the terminal 205. It will be observed by the manipulation of the switch lever 209 the primary circuit may be opened or closed to disconnect or connect the machine for operation. The circuit breaker 212 is provided for use in connection with a safety bail 214 extending across a front rail 215 of the frame 7 (see Fig. 29) and loosely supported at its upper edge by screws 216. At its left hand end the bail 214 is extended downwardly somewhat and provided with a pin 217 extended rearwardly and disposed to engage a down turned portion 218 of the circuit breaker 212. If, in the rapid advance of the machine over the platen, the bail 214 should meet with an obstruction, it will be moved back against the slight resistance of the spring 213 and will cause the member 212 to swing back, thus breaking the circuit and stopping the machine.

It is believed that from the foregoing the construction, operation and advantages of my invention will be clearly apparent, but I reserve the right to effect such changes, modifications and variations of the illustrated structure as may fall fairly within the scope of the protection prayed.

I claim:

1. In a machine of the class described, the combination with a platen, a frame movable back and forth, a carriage movable on the frame, separate motors both mounted on the frame for respectively moving the frame and carriage, the former in either direction, and automatically operated means for rendering the frame moving motor ineffective controlled by movement of the frame in either direction.

2. In a machine of the class described, the combination with a frame, a carriage thereon and printing mechanism, of a motor for moving the carriage, a single device engaged by the carriage for automatically beginning and ending the effective operation of the motor and a key mounted on the carriage for operative connection with said device in any position of said carriage.

3. In a machine of the class described, the combination with a platen, a movable frame, a carriage movable on the frame and printing mechanism on the carriage, of two motors mounted on the frame, one to advance the carriage and the other to return the carriage and advance the frame, and controlling mechanism for the carriage return motor operated by movement of the frame and carriage respectively.

4. In a machine of the class described, the combination with a platen, a movable frame, a carriage movable on the frame and printing mechanism on the carriage, of two motors mounted on the frame, one to advance the carriage and the other to return the carriage and advance the frame, frame returning mechanism operated by the carriage return motor, and means operated by the movement of the carriage and frame to render the carriage return motor effective and ineffective respectively.

5. In a machine of the class described, the combination with a platen, a movable frame, a carriage movable on the frame and printing mechanism on the carriage, of two motors mounted on the frame, one to advance the carriage and the other to return the carriage and advance the frame, frame returning mechanism operated by the carriage return motor, a control member for the carriage return motor, means movable with the carriage for moving said control member and frame operated means for rendering the frame returning mechanism ineffective.

6. In a machine of the class described, the combination with a platen, a movable frame, a carriage movable on the frame and printing mechanism on the carriage, of two motors mounted on the frame, one to advance the carriage and the other to return the carriage and advance the frame, frame returning mechanism operated by the carriage return motor, means operated by the movement of the carriage in one direction to render the carriage return motor effective, means operated by the movement of the frame in either direction to render the return motor ineffective.

7. In a machine of the class described, the combination with a platen, a movable frame, a movable carriage and printing mechanism, of a motor for moving the frame and carriage, and motor controlling means operated by movement of the frame.

8. In a machine of the class described, the combination with a platen, a frame, a carriage and printing mechanism on the carriage, of a carriage return motor, a connection between the motor and carriage including a clutch, and a control bar, and means on the carriage for operating the bar at any point in the carriage travel.

9. In a machine of the class described, the combination with a platen, a movable frame, a movable carriage, and printing mechanism, of a combined carriage and frame return motor, automatic motor controlling means including a device adjustable to determine the particular point in the carriage travel at which the controlling means shall operate and frame operated mechanism for automatically stopping the motor.

10. In a machine of the class described, the combination with a platen, a movable frame, a carriage movable on the frame and printing mechanism on the carriage, of mechanism carried by the frame to return the carriage and advance the frame and including a motor, means for rendering the motor effective and means operated by the movement of the carriage and frame, respectively, to disconnect said last named mechanism from the motor.

11. In a machine of the class described, the combination with a platen, a frame, and a carriage, relatively movable, a carriage return motor, and motor controlling means including a key, and control members mounted on the frame and carriage, respectively, to move therewith and normally in contact in any position of the frame and carriage.

12. In a machine of the class described, the combination with a platen, a movable frame, a movable carriage on the frame, a carriage return motor mounted on and movable with the frame, and motor controlling means including a key movable with the carriage and operative to render the motor effective in any position of the carriage and automatic means for rendering the motor ineffective after its function is performed.

13. In a machine of the class described, the combination with a platen, a movable frame, a movable carriage on the frame, a carriage return motor mounted on and movable with the frame, and motor controlling means including a key movable with the carriage and operative to render the motor effective in any position of the carriage, and automatic means for rendering the motor effective and ineffective in different positions of the carriage.

14. In a machine of the class described, the combination with a platen, a frame, a movable carriage and printing mechanism, of a carriage return motor, a connection between the motor and carriage including a clutch and a control bail disposed lengthwise of the carriage travel and a bail operating device mounted on the carriage and engaging the bail in any position of said carriage.

15. In a machine of the class described, the combination with a platen, a frame, a movable carriage and printing mechanism, of a carriage return motor, a connection between the motor and carriage including a clutch, a control bail and means on the carriage for operating the bail and engaging the bail in any position of the carriage.

16. In a machine of the class described, the combination with a platen, a frame, a movable carriage and printing mechanism, of a carriage return motor, a connection between the motor and carriage including a clutch, a control bail for the clutch and settable devices whereby the bail will be moved in opposite directions by the carriage at different carriage positions.

17. In a machine of the class described, the combination with a platen, a frame, a carriage movable on the frame, a carriage motor and motor controlling mechanism including a clutch, a control bail, cams adjustable on the bail and devices movable with the carriage to engage the cams and operate the bail in opposite directions in different positions of the carriage.

18. In a machine of the class described, the combination with a platen, a movable frame, a carriage movable on the frame, a carriage motor, a motor circuit, and automatic controlling means for the circuit, operated by movement of the frame and carriage respectively.

19. In a machine of the class described, the combination with a platen, a frame movable back and forth, a carriage movable in opposite directions, respectively on the frame, a carriage motor, a motor circuit, and carriage and frame operated means controlling the circuit in either direction of movement of said carriage and frame.

20. In a machine of the class described, the combination with a platen, a frame, a carriage movable on the frame, a carriage motor, a motor circuit including a circuit closer, a clutch in the line of connection between the motor and carriage and controlling mechanism common to the circuit closer and clutch, and including a control key movable with the carriage.

21. In a machine of the class described, the combination with a platen, a frame, a carriage movable on the frame, a carriage motor, a motor circuit including a circuit closer, a clutch in the line of connection between the motor and carriage and controlling mechanism common to the circuit closer and clutch and including a control bail, a key movable with the carriage and operatively related to the bail throughout the carriage travel, and carriage operated means for moving the bail.

22. In a machine of the class described, the combintion with a platen, a movable frame, a carriage and printing mechanism having unitary advance and return movement on the frame, of a carriage motor, a motor circuit, a clutch between the motor and carriage, means for locking the clutch, and means controlling the clutch lock, the clutch and the motor circuit including cooperating devices on the frame and carriage respectively operatively related throughout movement of the carriage in either direction.

23. In a machine of the class described, the combination with a platen, a frame, a movable carriage and printing mechanism, of a motor, a worm driven thereby, a worm gear, a shaft, a slip-clutch between the worm gear and shaft, a pinion geared to the carriage, a clutch between the pinion and shaft, and means for operating the clutch.

24. In a machine of the class described, the combination with a platen, a frame, a movable carriage and printing mechanism, of a motor, a worm driven thereby, a worm gear, a shaft, a slip-clutch between the worm gear and shaft, a pinion geared to the carriage, a clutch between the pinion and shaft and a clutch lock, and means for operating the clutch lock and clutch.

25. In a machine of the class described, the combination with a platen, a line space frame, a carriage and printing mechanism, of line spacing mechanism, both manual and automatic operating mechanism therefor and automatic frame returning mechanism operating through an element of the line spacing mechanism.

26. In a machine of the class described, the combination with a platen, a line space frame, a carriage and printing mechanism, of line spacing mechanism operated by the movement of the carriage in one direction and held thereby against retraction until the carriage moves in the opposite direction and means operating to release the line spacing mechanism while the carriage is fully retracted.

27. In a machine of the class described, the combination with a platen, a frame, a carriage and printing mechanism, of line spacing mechanism, a catch connecting the carriage with the line spacing mechanism to operate the latter and means for camming the catch to break the connection.

28. In a machine of the class described, the combination with a platen, a frame, a carriage and printing mechanism, of line spacing mechanism, a catch connecting the carriage with the line spacing mechanism to operate the latter and means for camming the catch to break the connection, said means including a movable cam block coacting with the catch to permit free movement of the catch in one direction and to operate the catch when moved in the opposite direction.

29. In a machine of the class described, the combination with a platen, a line spacing frame and a carriage movable on the frame, of line spacing mechanism for the frame, means whereby the movement of the carriage will cause the operation of the line spacing mechanism and lock it against further operation, and means for unlocking the line spacing mechanism while the carriage is in position to lock the same.

30. In a machine of the class described, the combination with a platen, a movable frame and a carriage movable on the frame, of line spacing mechanism for the frame, and means whereby movement of the carriage in one direction will operate the line spacing mechanism and less movement of the carriage in the opposite direction will release the line spacing mechanism.

31. In a machine of the class described, the combination with a platen, a movable frame and a carriage movable on the frame, of line spacing mechanism for the frame, a draw bar connected to the line spacing mechanism and means for connecting and disconnecting the carriage and draw bar.

32. In a machine of the class described, the combination with a platen, a movable frame and a carriage movable on the frame, of line spacing mechanism for the frame, a draw bar for the line spacing mechanism, a block adjustable on the bar and a catch movable with the carriage to engage the block.

33. In a machine of the class described, the combination with a platen, a movable frame, a carriage movable on the frame and line spacing mechanism for the frame, of a draw bar mounted on the frame and connected to the line spacing mechanism, a block on the draw bar, a catch on the carriage to engage the block, and means for releasing the catch from the block.

34. In a machine of the class described, the combination with a platen, a movable frame, a carriage movable on the frame and line spacing mechanism for the frame, of a draw bar mounted on the frame and connected to the line spacing mechanism, a block on the draw bar, a catch on the carriage to engage the block by movement of the carriage in one direction, and means whereby movement of the carriage in the opposite direction will disengage the catch from the block.

35. In a machine of the class described, the combination with a platen, a frame, a carriage movable on the frame and printing mechanism, of line spacing mechanism, and an extensible connection between the carriage and the line spacing mechanism to accommodate further movement of the carriage after the full operation of the line spacing mechanism.

36. In a machine of the class described, the combination with a platen, a frame, a carriage movable on the frame and printing mechanism, of line spacing mechanism, and an extensible connection between the carriage and the line spacing mechanism including a spring yieldable upon further movement of the carriage after the line spacing mechanism has been operated.

37. In a machine of the class described, the combination with a platen, a movable frame, a movable carriage on the frame and printing mechanism on the carriage of retractile line spacing mechanism operated by the carriage and means operated by the initial movement of the carriage in the opposite direction to release the line spacing mechanism and permit its quick retraction.

38. In a machine of the class described, the combination with a flat platen, a frame, a carriage movable on the frame, carriage feeding mechanism movable with carriage, a carriage return motor, and means for locking the carriage feeding mechanism by movement of the carriage.

39. In a machine of the class described, the combination with a platen, a frame, a carriage movable on the frame and carriage feeding mechanism including an escapement movable with the carriage, of a carriage return motor, an escapement lock, and means operative to bring the motor into action and to actuate the lock in any position of the carriage.

40. In a machine of the class described, the combination with a platen, a frame, a carriage movable on the frame and carriage feeding mechanism including an escapement movable with the carriage, of a carriage return motor, an escapement lock, and means operated by movement of the carriage for bringing the motor into action and for locking the escapement.

41. In a machine of the class described, the combination with a platen, a frame, a carriage movable on the frame and carriage feeding mechanism including an escapement movable with the carriage, of a carriage return motor, an escapement lock, and means operated by movement of the carriage for bringing the motor into action and for locking the escapement in one position of the carriage and for releasing the escapement and rendering the motor ineffective in another position of the carriage.

42. In a machine of the class described, the combination with a platen, a frame, a carriage movable on the frame, carriage feeding mechanism and a lock therefor both movable with the carriage, of a carriage return motor, and controlling means common to the motor and lock and operative in any position of the carriage.

43. In a machine of the class described, the combination with a platen, a frame, a carriage movable on the frame, carriage feeding mechanism and a lock therefor both movable with the carriage, of a carriage return motor, and controlling means common to the motor and lock operated by movement of the carriage and settable in the direction of the carriage travel for variable operation.

44. In a machine of the class described, the combination with a platen, a frame, a carriage movable on the frame, carriage feeding mechanism and a lock therefor both movable with the carriage, of a carriage return motor, and controlling means common to the motor and lock and operated by the carriage.

45. In a machine of the class described, the combination with a platen, a frame, a carriage movable on the frame, carriage feeding mechanism and a lock therefor, of a carriage return motor, and controlling means common to the motor and lock and including a controlling key mounted on the carriage.

46. In a machine of the class described, the combination with a platen and a frame, of a motor, mechanism operative to effect relative movement of the frame and platen back and forth, a carriage movable on the frame and printing mechanism on the carriage, and carriage moving mechanism, both said mechanisms operated by said motor.

47. In a machine of the class described, the combination with a platen, a frame movable thereover and a carriage movable on the frame, of a motor for moving the frame in opposite directions, means for determining the direction in which the frame will move, said means having a neutral position to render the motor ineffective, and means operated by movement of the frame in either direction to move said first means to neutral position.

48. In a machine of the class described, the combination with a platen, a frame movable back and forth and a carriage movable on the frame, of a motor mounted on the frame to drive the same, and a single motor controlling device mounted in a stationary position and operated to control the direction of movement of the frame.

49. In a machine of the class described, the combination with a platen, a frame movable back and forth and a carriage movable on the frame, of a motor for moving the frame and carriage, and a motor controlling device mounted in a stationary position and operative in opposite directions to control the direction of movement of the frame.

50. In a machine of the class described, the combination with a platen frame, a platen, a frame movable in opposite directions respectively, and a carriage on the frame, of a frame driving motor, and motor controlling mechanism including devices mounted below the platen and operative by the knee of the operator to control the direction of movement of the frame.

51. In a machine of the class described, the combination with a platen frame, a platen, a movable frame and a carriage on the frame, of a frame driving motor, and motor controlling mechanism including movable devices mounted on the platen frame and the movable frame respectively, said devices being in constant engagement for movement one by the other in any position of the frame.

52. In a machine of the class described, the combination with a platen frame, a platen, a movable frame and a carriage on the frame, of a frame driving motor, and motor controlling mechanism including a frame control bail mounted on the platen frame.

53. In a machine of the class described, the combination with a platen frame, a platen, a movable frame and a carriage on the frame, of a frame driving motor, and motor controlling mechanism including a frame control bail mounted on the platen frame, and coacting means mounted on the movable frame for movement by said bail.

54. In a machine of the class described, the combination with a platen frame, a platen, a frame movable back and forth on the platen frame, and a movable carriage, of reversible frame driving mechanism mounted on the movable frame and including a motor and direction controlling mechanism including devices mounted on the platen frame and movable frame respectively and connected throughout the movement of the movable frame to said reversible mechanism.

55. In a machine of the class described, the combination with a platen frame, a platen, a frame movable on the platen frame, and a movable carriage, of a frame driving motor and controlling means therefor including members mounted on the movable frame and the platen frame, respectively, and having rolling contact throughout the travel of the movable frame.

56. In a machine of the class described, the combination with a platen, a platen frame, a reciprocating frame movable thereon, a reciprocating carriage, a combined frame and carriage driving mechanism including a single motor and motor controlling means operated by the movement of the frame and carriage respectively in either direction.

57. In a machine of the class described, the combination with a flat platen, a platen frame, a frame movable thereon over the platen, a carriage, a frame driving mechanism including a motor, and manually operative motor controlling means including a device movable over the platen with the movable frame and adapted when obstructed to render the motor ineffective.

58. In a machine of the class described, the combination with a platen, a platen frame, a frame movable thereon, a carriage, frame driving means including a motor and reversing mechanism, and means including a pair of knee levers controlling respectively the motor and reversing mechanism.

59. In a machine of the class described, the combination with a platen, a movable frame and a carriage, of a frame driving motor, reversible gearing between the motor and the frame, a circuit closer for the motor, and controlling mechanism common to the gearing and circuit closer.

60. In a machine of the class described, the combination with a platen, a movable frame and a carriage, of a frame driving motor and a motor controlling device movable in different directions to determine the direction of the frame drive and serving when moved to render the motor effective to drive the frame and means for automatically stopping the motor in either direction of movement of the frame.

61. In a machine of the class described, the combination with a platen, a movable frame and a carriage, of a frame driving motor, and a motor controlling mechanism including a control bail extended along the platen and movable in different directions to render the motor effective and ineffective, and mechanism operated by said bail to determine the direction of the frame drive.

62. In a machine of the class described, the combination with a platen frame and platen, of a movable frame, a platen frame, a carriage on the movable frame, a frame driving motor on the movable frame, a motor controlling device on the platen frame, and means for maintaining the connection between the controlling device and motor throughout the movement of the movable frame.

63. In a machine of the class described, the combination with a platen, a movable frame and a carriage movable on the frame, of a driving motor, motor driven mechanism for moving the frame and carriage respectively, and means for controlling the operation of the motor by movement of the frame and carriage.

64. In a machine of the class described, the combination with a flat platen, of a frame having limited movement for line spacing and also free movement, a carriage movable on the frame, driving mechanism including a motor for retracting the carriage and line spacing the frame and also for imparting free movement to the frame, and means for selectively controlling the operation of said mechanism.

65. In a machine of the class described, the combination with a platen, of a movable frame, a carriage movable on the frame, normally ineffective motor driving mechanism common to the carriage and frame and operative to move the frame and to move the carriage on the frame in a different direction, and controlling mechanism whereby the motor is rendered effective to drive the frame or to move the carriage on the frame.

66. In a machine of the class described, the combination with a platen, of a frame having both free movement and line space movement back and forth, frame driving mechanism including a normally inactive motor, and selective controlling means for bringing the motor and driving mechanism into action to impart free movement to said frame in either direction and to automatically stop the motor.

67. In a machine of the class described, the combination with a stationary platen, and a frame movable thereon for line spacing and also having free movement back and forth over the platen, of a carriage movable on the frame, combined frame and driving mechanism including a motor, and selective controlling mechanism bringing the motor and driving mechanism into action to retract the carriage or to effect free movement of the frame as desired and to stop the motor after the carriage retraction or said free movement of the frame.

68. In a machine of the class described, the combination with a platen, a movable frame, and a carriage movable on the frame, of a driving motor for both the carriage and frame, and motor controlling mechanism including separate devices for bringing the motor into action to drive either the frame or the carriage.

69. In a machine of the class described, the combination with a platen, a frame having free movement thereover and also limited line spacing movement, and a carriage movable on the frame, of a motor operative to retract the carriage and line space the frame or to impart free movement to the frame, and motor controlling mechanism including separate devices operative to determine the function to be performed by the motor.

70. In a machine of the class described, the combination with a platen, a frame movable back and forth and a carriage movable on the frame, of a motor operative to move the frame in either direction and also operative to move the carriage on the frame, and controlling mechanism whereby the motor may be caused to operate the carriage or to drive the frame in one direction or the other.

71. In a machine of the class described, the combination with a platen, a frame movable forward and back, and a carriage movable back and forth on the frame, of a motor operative to move the frame in either direction or to retract the carriage and controlling mechanism operative to determine whether the frame or carriage shall be driven and also to determine the direction in which the frame shall move, if driven.

72. In a machine of the class described, the combination with a platen, a movable frame, and a carriage movable on the frame, of a motor, frame moving mechanism and carriage moving mechanism, both operated by the motor.

73. In a machine of the class described, the combination with a platen, of a frame movable for line spacing, a carriage movable on the frame, and printing mechanism on the carriage, of a motor, carriage moving mechanism and line spacing mechanism for moving the frame, both operated by the motor.

74. In a machine of the class described, the combination with a platen, of a frame movable for line spacing, a carriage having an advancing and a retracting movement on the frame and printing mechanism on the carriage, of a motor, carriage retracting mechanism and line spacing mechanism for moving the frame, both operated by the motor.

75. In a machine of the class described, the combination with a platen, of a frame movable for line spacing, a carriage having an advancing and a retracting movement on the frame, and printing mechanism on the carriage, of a motor mounted on and movable with the frame, and carriage retracting mechanism and line spacing mechanism, both operated by the motor.

76. In a machine of the class described, the combination with a platen, a frame having an advancing and a retracting movement, a carriage movable on the frame, and printing mechanism on the carriage, of a motor, and carriage moving mechanism and frame moving mechanism for moving the frame in either direction, both operated by the motor.

77. In a machine of the class described, the combination with a platen, a frame having an advancing and retracting movement, a carriage movable on the frame, and printing mechanism on the carriage, of a motor mounted on and movable with the frame, carriage moving mechanism and frame moving mechanism for moving the frame in either direction, both mechanisms being operated by the motor.

78. In a machine of the class described, the combination with a platen, a frame having advancing movement, a carriage having an advancing and a returning movement on the frame, and printing mechanism on the carriage, of two motors mounted on the frame, one to advance the carriage, and carriage return mechanism and frame advancing mechanism, both operated by the other motor.

79. In a machine of the class described, the combination with a platen, a frame having limited movement thereover for line spacing and also free movement back and forth, of a motor, line spacing mechanism for the frame, and mechanism for moving the frame back and forth, both mechanisms operated by said motor.

80. In a machine of the class described, the combination with a platen, a frame having limited movement thereover for line spacing and also free movement back and forth, of a motor mounted on and movable with the frame, line spacing mechanism for the frame, and mechanism for moving the frame back and forth, both mechanisms operated by said motor.

81. In a machine of the class described, the combination with a platen, a frame movable thereover back and forth, and a carriage on the frame, of a motor mounted on and movable with the frame, mechanism mounted on said frame and operated by said motor for moving said frame in either direction, and automatic motor controlling means for determining the extent of movement of the frame in either direction.

82. In a machine of the class described, the combination with a flat platen, a frame movable back and forth thereover, and a frame propelling shaft movable with the frame, of mechanism for driving said shaft in either direction and including a motor, all mounted on the frame for movement therewith.

83. In a machine of the class described, the combination with a flat platen, a frame movable back and forth thereover, and a frame propelling shaft movable with the frame, of mechanism for driving said shaft in either direction and including a motor all mounted on the frame for movement therewith, and means operated by the frame for controlling the duration of the drive in either direction.

84. In a machine of the class described, the combination with a flat platen, a frame movable thereover, and a carriage movable on the frame and having unitary movement therewith, of carriage moving mechanism including a power transmitting unit mounted on the frame to follow the carriage during said unitary movement, a motor for driving said unit, and frame moving mechanism also including a power transmitting unit mounted on the frame and driven by said first unit.

85. In a machine of the class described, the combination with a platen, a movable frame, a carriage movable on the frame, and printing mechanism on the carriage, of carriage return mechanism mounted on the frame and including a motor, motor controlling mechanism mounted on the frame and operated by the carriage to effect return of the latter, and device on the frame for rendering the motor ineffective at any point in the return of the carriage.

86. In a machine of the class described, the combination with a flat platen, a frame movable thereover, a carriage movable on the frame, and printing mechanism on the carriage, of frame moving mechanism including a motor, and motor controlling mechanism operating by movement of the frame and carriage respectively.

87. In a machine of the class described, the combination with a platen, a frame movable thereover, a carriage movable on the frame, and printing mechanism on the carriage, of carriage moving mechanism mounted on and movable with the frame and including a motor, and frame moving mechanism operated by the carriage moving mechanism, and the carriage respectively.

88. In a machine of the class described, the combination with a platen, a frame movable back and forth thereover, and a carriage movable on the frame, of mechanism for moving the carriage, and mechanism for moving the frame in opposite directions and operated by the carriage moving mechanism and the carriage respectively.

89. In a machine of the class described, the combination with a platen, a frame movable back and forth thereover, and a carriage movable on the frame, of mechanism for moving the carriage, mounted on the frame and including a motor, and mechanism for moving the frame also mounted on the frame and operated to move said frame in opposite directions by the carriage moving mechanism and the carriage respectively.

90. In a machine of the class described the combination with a platen, a frame movable back and forth thereover, and a carriage movable on the frame, of mechanism for moving the carriage and including a motor, mechanism operated to move the frame in opposite directions by the carriage moving mechanism and movement of the carriage respectively, and motor controlling mechanism operated by movement of the frame and carriage respectively.

91. In a machine of the class described the combination with a platen, a frame movable back and forth thereover, and a carriage movable on the frame, of carriage return mechanism including a motor, and mechanism operated to move the frame in opposite directions by the carriage moving mechanism and return movement of the carriage respectively.

92. In a machine of the class described, the combination with a flat platen, a line space frame movable back and forth thereover, and a carriage movable on the frame in opposite directions respectively, of a combined frame and carriage driving mechanism mounted on the line space frame and including a motor, a motor circuit, circuit controlling devices and driving clutches for the frame and carriage, respectively, and devices operated by the frame and carriage respectively, in either direction of movement thereof for operating their respective driving clutches and circuit controlling devices.

93. In a machine of the class described, the combination with a flat platen, and a frame and carriage, relatively movable, and printing mechanism on the carriage, of a combined frame and carriage driving mechanism mounted on the frame and including a motor, a motor circuit, a circuit controlling device, a clutch and a clutch lock mounted on the frame between the motor and carriage, and cooperating devices for operating the circuit controlling device, the clutch and the clutch lock, and mounted on the frame and carriage respectively in operative relation throughout relative movement of the frame and carriage.

94. In a machine of the class described, the combination with a platen, and a frame movable back and forth thereover, of frame driving mechanism including a motor, a direction controlling device between the motor and frame, means for rendering the motor effective and ineffective, means for controlling the direction controlling device, and a single operating member common to both of said means.

95. In a machine of the class described, the combination with a platen, a frame movable back and forth thereover, frame driving mechanism including a motor and direction controlling devices, means for rendering the motor effective and ineffective, means for controlling said direction controlling devices, a single operating member common to both of said means, and a pair of knee levers operative to move said member in opposite directions.

96. In a machine of the class described, the combination with a platen, a line space frame movable thereover, and manually operative line space mechanism for moving said frame a line at a time and including a frame driving shaft, of a motor drive for said shaft for moving the frame a plurality of line space distances at a time, and means for controlling said drive.

97. In a machine of the class described, the combination with a platen, a frame movable back and forth, a movable carriage, and printing mechanism, of a combined carriage and frame moving motor, automatic motor controlling means including devices relatively adjustable to predetermine the points in the carriage travel at which the motor controlling means shall operate, and mechanism operated by movement of the frame in either direction for automatically stopping the motor in the two extreme positions of said frame.

98. In a machine of the class described, the combination with a platen, a frame, a carriage and printing mechanism, of line spacing mechanism including an operating drawbar moved in one direction by the carriage, means for intermittently connecting the carriage and draw bar, and means for camming the connection between the carriage and draw bar to release the line spacing mechanism for retraction independently of the carriage.

99. In a machine of the class described, the combination with a platen, a platen frame, a reciprocating frame movable thereon, a carriage, a combined frame and carriage driving mechanism including a single motor, and automatic means for controlling the motor in different positions of the frame.

100. In a machine of the class described, the combination with a platen, a movable frame having a limited line spacing movement and also having free movement, and a carriage movable on the frame, of combined frame and carriage driving mechanism including a single motor, and means including the carriage for selectively securing either a line space movement or a free movement of the movable frame by operation of said combined driving mechanism.

In testimony whereof I have affixed my signature.

HARRY A. FOOTHORAP.